(12) United States Patent
Momose

(10) Patent No.: US 7,576,875 B2
(45) Date of Patent: Aug. 18, 2009

(54) INK JET PRINTER, PRINTER CONTROL UNIT, PRINTER SYSTEM INCLUDING THE SAME, AND STORAGE MEDIUM WITH THE OPERATION PROGRAM OF THE PRINTER CONTROL UNIT STORED FOR CONTROLLING DOUBLE-SIDE PRINTING

(75) Inventor: Hiroaki Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 617 days.

(21) Appl. No.: 11/184,896

(22) Filed: Jul. 20, 2005

(65) Prior Publication Data

US 2005/0253886 A1 Nov. 17, 2005

Related U.S. Application Data

(62) Division of application No. 09/679,882, filed on Oct. 5, 2000, now abandoned.

(30) Foreign Application Priority Data

Oct. 5, 1999 (JP) ................... 11-284741
Apr. 7, 2000 (JP) ................... 2000-106824
Apr. 7, 2000 (JP) ................... 2000-106825

(51) Int. Cl.
*G06F 3/12* (2006.01)
*G06F 15/00* (2006.01)

(52) U.S. Cl. ...................... 358/1.13; 358/1.1

(58) Field of Classification Search ........... 358/1.1, 358/1.11, 1.12, 1.15, 1.9, 1.13, 1.14, 1.16, 358/1.17, 1.18; 347/16, 5, 9, 20, 42
See application file for complete search history.

(56) References Cited

U.S. PATENT DOCUMENTS 4,645,195 A 2/1987 Scranton et al.
4,990,941 A 2/1991 Kawai
5,564,848 A 10/1996 Quintana
5,682,247 A 10/1997 Webster et al.
5,836,706 A * 11/1998 Ruhe ........................ 400/636
5,954,436 A * 9/1999 Kageyama et al. ......... 400/188
6,012,809 A 1/2000 Ikeda et al.

(Continued)

FOREIGN PATENT DOCUMENTS

EP 0 418 515 A1 3/1991

(Continued)

OTHER PUBLICATIONS

Lorenze RV; "Simple and Compact Method for Automated Duplex Printing" Xerox Disclosure Journal, Xerox Corporation; vol. 21; No. 1; 1996; pp. 17 & 18; XP000626160.

(Continued)

*Primary Examiner*—Edward L Coles
*Assistant Examiner*—Thierry L Pham
(74) *Attorney, Agent, or Firm*—Sughrue Mion, PLLC

(57) ABSTRACT

An ink jet printer with a double-side printing function enables to print page images at a proper position on both surfaces of a cut paper, is provided. When feeding the cut paper A having an image printed on the front surface, the feeding roller 407 is rotated in the direction C1 to feed the cut paper A and simultaneously the registering rollers 410*a*, 410*b* are rotated in the direction D1 to push back the cut paper. In addition, the double-side printing is easily realized in both of the cases where the ink jet printer with the double-side printing function is connected to the host, and where the ink jet printer without double-side printing function is connected to the host by having the host make an inquiry of the printer whether or not double-side printing is available (step 6). Based on the results of the inquiry, printing commands are generated and sent to the printer.

7 Claims, 20 Drawing Sheets

U.S. PATENT DOCUMENTS

| | | |
|---|---|---|
| 6,053,645 A | 4/2000 | Myung |
| 6,065,397 A | 5/2000 | Sato |
| 6,115,573 A * | 9/2000 | Izumi et al. ............... 399/237 |
| 6,142,467 A | 11/2000 | Funada |
| 6,273,535 B1 | 8/2001 | Inoue et al. |
| 6,312,073 B1 | 11/2001 | Inora et al. |
| 6,417,931 B2 | 7/2002 | Mori et al. |

FOREIGN PATENT DOCUMENTS

| | | |
|---|---|---|
| EP | 0 786 736 A2 | 7/1997 |
| EP | 0 941 851 A2 | 9/1999 |
| EP | 0 941 851 A3 | 4/2000 |
| JP | 63-3986 | 1/1988 |
| JP | 63-236653 | 10/1988 |
| JP | 1-299078 | 12/1989 |
| JP | 2-14175 | 1/1990 |
| JP | 3-100760 | 4/1991 |
| JP | 4-49069 | 2/1992 |
| JP | 6-344606 | 12/1994 |
| JP | 07267402 A * | 10/1995 |
| JP | 2839334 | 10/1998 |
| JP | 10-305625 A | 11/1998 |
| JP | 11-99724 | 4/1999 |
| JP | 11-227278 | 8/1999 |
| JP | 2000-1010 | 1/2000 |

OTHER PUBLICATIONS

04049069, Jun. 18, 1990, Canon Inc, Printing Control Apparatus, (Abstract).

* cited by examiner

FIG.8

| RANGE OF INK DUTY (%) | WAITING TIME ΔT (SEC.) |
|---|---|
| 0 ≦ V < 30 | 0 |
| 30 ≦ V < 70 | T |
| 70 ≦ V | 2T |

800 = RANGE OF INK DUTY column; 801 = WAITING TIME column

FIG.9

| RANGE OF INK DUTY (%) | NUMBER OF PULSE FOR REGISTERING ROLLER (PAPER ABUTMENT) | NUMBER OF PULSE FOR FEED ROLLER (PAPER ABUTMENT) | NUMBER OF PULSE FOR FEED ROLLER (PAPER RETRACTION) |
|---|---|---|---|
| 0 ≦ V < 30 | 0 | 0 | 0 |
| 30 ≦ V < 70 | 116 | 116 | 110 |
| 70 ≦ V | 129 | 129 | 289 |

FIG.10

| PRINTING MEDIUM TYPE | WAITING TIME (SEC) |
|---|---|
| PLAIN SHEET | T |
| FINE PRINTING PAPER | T |
| SUPER-FINE PRINTING PAPER | T |
| ENAMEL PAPER | T |
| MATTE PAPER | 0 |

FIG.11

| INK TYPE | WAITING TIME (SEC) |
|---|---|
| A | T |
| B | 3T |
| C | T |

2300

2400

INK JET PRINTER, PRINTER CONTROL UNIT, PRINTER SYSTEM INCLUDING THE SAME, AND STORAGE MEDIUM WITH THE OPERATION PROGRAM OF THE PRINTER CONTROL UNIT STORED FOR CONTROLLING DOUBLE-SIDE PRINTING

This is a Divisional Application under 37 C.F.R. § 1.53(b) of U.S. application Ser. No. 09/679,882 filed Oct. 5, 2000; the entire disclosure of the prior application is herby incorporated by reference.

BACKGROUND OF THE INVENTION

1. Field of the Invention

The present invention relates to an image recording technique and, more specifically, to an ink jet printer which lends itself to use for double-side printing, and to the technique for controlling the ink jet printer.

2. Description of Related Art

An ink jet printer disclosed in Japanese Patent Laid-Open No. 9-254376 is known as a printer that is able to print images on both surfaces of a printing medium. When double-side printing mode is designated in this ink jet printer, a printing medium in the paper-feeding cassette is fed between a print head and a platen, passed therethrough, moved backward again, and then fed again between the print head and the platen from the same side. During such an automatic feeding operation, an image for the odd-numbered page is printed on one surface of the printing medium, and then an image for the even-numbered page is printed on the other surface of the printing medium (hereinafter, the surface on which the image for the odd-numbered page is printed is referred to as a front surface, and the surface on which the image for the even-numbered page is printed is referred to as a back surface of a printing medium).

In addition to this type of ink jet printer, as another type of printer that is able to print images on both surfaces of a printing medium, an ink jet printer in which the user reverses the printing medium which has finished printing on the front surface is also known. When double-side printing mode is designated in this type of ink jet printer, printing media are fed from the paper feeding tray successively, and images for the odd-numbered pages are printed on the front surfaces of these printing media. When all the images for the odd-numbered pages were printed, the user reverses a stack of printing paper on which the images for odd-numbered pages are printed and loads it again on the paper feeding tray, so that those printing medias are again fed from the paper feeding tray successively, and the images for the even-numbered pages are printed on the back surface thereof successively.

In these two types of ink jet printers, positioning of the leading edge of the printing medium being conveyed with respect to the print head is carried out by suspending the rotation of the upper and lower registering rollers arranged before the print head and abutting the leading edge of the printing paper against the nip between those registering rollers. This type of registering roller is stated in Japanese Patent Laid-Open No. 5-147208 relating to the ink jet printer that is able to print on both surfaces of a printing medium.

In general, the condition of the printing medium of the printing paper is apparently different before and after the page image is printed on the front surface as shown below. Since the printing medium having printed the page image on the front surface contains ink therein, the weight is increased in comparison with the blank printing medium including no ink at all as a matter of course. In addition, the printing medium having printed a page image on the front surface is subject to irregular waves or curls. In this way, the printing medium of which increased in weight corresponding to the weight of ink, or the printing paper having irregular waves or curls may not be able to travel smoothly when it is fed in the same condition as the case of the blank printing medium. It may cause skew. Since the printing medium having a page image printed on the front surface thereof contains ink therein and thus the hygroscopicity is deteriorated, it needs longer time to be dried than the blank printing medium. Therefore, when the page image is printed again on the back surface of the printing medium that is deteriorated in hygroscopicity, the image cannot be dried in a short time as in the case of the blank printing medium.

However, in the two types of ink jet printers described above, the printing medium is fed in the same way for the front surface printing and the back surface printing. Therefore, when printing the image on the back surface, the medium cannot be fed as smoothly as the case of printing on the front surface. Therefore, when printing the page image on the back surface of the printing medium, the upper and lower registering rollers may start rotating again before the whole portion of the leading edge of the printing medium abuts completely against the nip between the upper and lower registering rollers. When it happens, the printing paper is conveyed from between the upper and lower registering rollers toward the print head even though the alignment of the leading edge of the printing medium with respect to the print head is not correctly made. When printing of the page image on the back surface is started under such a condition, the page image cannot be printed at the correct area on the back surface of the printing medium. Consequently, there may be the case where the page images printed on both surfaces of the printing medium are not in parallel with respect to each other. In the case of double-side printing for three or more pages, there may be the case where the printed printing medias are stacked one on another on the paper receiving tray even though ink on the back surface is not completely dried. When it happens, ink on the back surface of each printing medium on the paper receiving tray is transferred to the front surface of another printing medium, thereby deteriorating the quality of the page image for both surfaces of each printing medium on the paper receiving tray. It is apt to happen especially when the photo image is printed on the back surface.

The double-side printing function as described above is not inevitable for printing the page image on both surfaces of the printing medium. As stated in Japanese Patent Laid-Open No. 5-147208, for example, the existing ink jet printer that has no double-side printing function may also be used for printing the page image on both surfaces of the printing medium if the user deliberately carries out two steps of; giving an order to print only the images for the odd-numbered pages in the first place, and then designating to print only the images for the even-numbered pages. However, it is troublesome for users because it requires the repeated operations that are not necessary in the normal one-side printing.

Other techniques relating the printer that is able to print on both side surfaces of the printing medium are shown in Japanese Patent Laid-Open No. 3-100760, No. 4-49069, No. 63-236653, No. 1-299078, No. 63-3986, No. 2-14175, No. 11-99724, No. 11-227278, No. 6-344606, and U.S. Pat. No. 2,839,334.

SUMMARY OF THE INVENTION

Accordingly, the first object of the present invention is to provide technique to print high quality images by an ink jet printer even in the double-side printing job. The second object of the present invention is to allow the ink jet printer that is able to perform double-side printing to print high quality page images in the proper area on both surfaces of a plurality of printing medias successively. The third object of the present invention is to ease the operational trouble which a user encounters when executing double-side printing job by an ink jet printer.

In order to achieve the first object described above, the first embodiment of the present invention provides a printer control unit for issuing command to the printer that is able to perform double-side printing, comprising:

mode designation receiving means for receiving the designation of double-side printing mode in which both surfaces of a printing medium are the target surfaces to be printed;

command generating means for generating a command for adjusting the timing of feeding the printing medium for the second image that is to be printed later out of a pair of images to be printed on both surfaces of the printing medium in the case where the mode designation receiving means receives the designation of double-side printing mode; and command issuing means for issuing the command generated by the command generating means as the command to be supplied to the printer.

With this printer control unit, the timing in feeding the printing medias having images printed on the front surfaces that are subject to a timing lag before arriving the print head is adjusted. Consequently, the accuracy of the registration of the printing medias with respect to the print head is improved, so that the image is printed at the proper position of the printing medium.

In order to achieve the first object described above, the second embodiment of the present invention provides a printer control unit for issuing a command for suspending the advancement of a printing medium, which is being fed by the rotation of the feeding roller, by the roller located forward of the printing medium, comprising:

mode designation receiving means for receiving the designation of double-side printing mode in which both surfaces of the printing medium are the target surfaces to be printed;

command generating means for generating a command, upon receipt of the designation of the double-side printing mode by the printing mode designation receiving means, for rotating the registering roller in the direction to move the printing medium backward before restart of advancement and rotating the feeding roller in accordance with the rotation of the registering roller in order to feed the printing medium for printing the second image that is to be printed later out of a pair of images to be printed on both surfaces of the printing medium; and command output means for issuing the paper feed command generated by the paper feed command generating means as the command to be supplied to the printer.

With this printer control unit, during feeding operation of the double-side printing mode, the printing medium having an image printed on the front surface, which is subject to skew, is fed toward the registering rollers but its leading edge portion is flipped by the reverse rotation of the registering roller. By this operation, skew of the printing medium on a feed is corrected, and the position of the leading edges of the printing medium with respect to the print head is registered. Therefore, by executing double-side printing by the printer controlled by the printer control unit of the present invention, the image is printed at the proper position on the back surface of the printing medium having an image printed on the front surface.

In this printer control unit, it is also possible to arrange the command generating means to generate a command for rotating the registering roller and the feeding roller at rotational speeds in accordance with the type of the paper as the command to be supplied the printer. In this arrangement, the printing medium that can be conveyed smoothly and the printing medium that cannot be conveyed smoothly are both properly registered with respect to the print head. Therefore, the image may be printed at the proper position on various types of printing media.

The printer control unit according to the second embodiment may be provided with detecting means for detecting information on the quantity of ink used for printing a first image which is to be printed ahead of the other one of the pair of images, so that the command generating means generates a command for rotating the registering roller and the feeding roller at a rotational speed in accordance with information detected by the detecting means on the first image paring with the second image as the command for conveying the printing medium for printing the second image. The more quantity of ink the printing medium contains in the image printed on the front surface, the harder it is to feed the printing medium smoothly, thereby resisting being registered with respect to the print head. However, in the arrangement described above, the printing medium printed on the front surface with an image may be registered with respect to the print head irrespective of the quantity of ink on the front surface.

In order to achieve the first object as described above, the present invention further provides a storage medium having an operation program of the printer control unit stored therein.

In other words, the present invention provides a storage medium having a program for controlling a double-side printing mechanism stored therein;

wherein the program is for making the printer control unit for controlling the printing mechanism execute;

a mode designation receiving process for receiving the designation of double-side printing mode in which both surfaces of a printing medium are the target surfaces to be printed;

a command generating process for adjusting the timing of feeding the printing medium, upon receipt of the designation of the double-the printing mode, for printing the second image that is to be printed later out of a pair of page images to be printed on both surfaces of the printing medium; and a command issuing process for issuing the command generated by the command generating process as a command to be supplied to the printing mechanism.

In addition, the present invention provides a storage medium having a program for controlling the printing mechanism that suspends advancement of the printing medium, which is being fed by the rotation of the feeding roller, by the registering roller located forward of the printing medium stored therein, wherein the program makes the printer control unit for controlling the printing mechanism execute;

a printing mode designation receiving process for receiving the designation of double-side printing mode in which both surfaces of a printing medium are the target surfaces to be printed;

a command generating process for generating a command, upon receipt of the designation of the double-side printing mode, for rotating the registering roller in the direction to move the printing medium backward before restart of advancement and for rotating the feeding roller in accordance with the rotation of the registering roller in order to feed the printing medium for printing the second image that is to be printed later out of a pair of page images to be printed on both surfaces of the printing medium; and a command issuing process for issuing the command generated by the command generating process as a command to be supplied to the printing mechanism.

This program may be for making the printer control unit execute the detecting process for detecting information on the quantity of ink used for printing the first image which is to be printed ahead of the other one of the pair of images, and generate a command for rotating the registering roller and the feeding roller at a rotational speed in accordance with the detected information on the first image paring with the second image, as the command on the second image in the command generating process.

Alternatively, the program may be for making the printer control unit generate a command for rotating the registering roller and the feeding roller at rotational speeds in accordance with the type of the printing medium as the command for conveying the printing medium for printing the second image.

In order to achieve the second object described above, the present invention provides a printer control unit for issuing a command to be supplied to the printer that is able to print on both surfaces of the printing medium, comprising:

printing mode designation receiving means for receiving the designation of double-side printing mode in which both surfaces of a printing medium are the target surfaces to be printed;

command generating means for, generating a command, upon receipt of the designation of double-side printing mode by the printing mode designation receiving means, for delaying the start of feeding the printing medium for printing the second image which is to be printed later out of a pair of page images having consecutive page numbers among a plurality of page images to be printed by the printer; and command issuing means for issuing the paper feed command generated by the command generating means as the command to be supplied to the printer.

With this printer control unit, since a waiting time is provided before feeding the printing medium having an image printed on the front page, printing of the image on the back surface may be started only after ink on the front surface of the printing medium is dried. Therefore, even when the front surface of the printing medium comes into contact with the roller while the printing medium is fed for printing on the back surface, the quality of the page image printed on the front surface of the printing medium is not deteriorated. Therefore, high-quality images may be printed on both surfaces of the printing medium.

It is also possible to provide detecting means for detecting information on the quantity of ink used for printing the first image which is to be printed ahead of the other one of the pair of images, so that the command issuing means generates a command for delaying the start of feeding the printing medium for printing the second image as long as the period of time corresponding to the waiting time according to information detected by the detecting means on the first image paring with the second image. In such an arrangement, a minimum waiting time required to let ink on the front surface of the printing medium dry is provided so as to prevent the throughput from decreasing. In this case, by reducing the waiting time for the second image in accordance with the period elapsed since finishing the first image paring the second image, the print processing is prevented from taking a long time unnecessarily. This arrangement is effective especially in the case where the printer begins printing the images for the back surfaces of a plurality of printing medias after finishing printing the image for the front surfaces of all of printing medias, since the time required for printing the image on the front surfaces of the following printing medias is counted as the waiting time.

Alternatively, it is also possible to provide the printer control unit with printing condition storing means in which the waiting times in correspondence with the type of printing medium and the type of ink are stored, so that the command generating means reads the waiting time corresponding to at least one of the type of printing medium on which the second image is printed and the type of ink used for printing the first image paring with the second image from the printing condition storing means, and generates a command for delaying the start of feeding printing medium for the second image as long as the period of time corresponding to the waiting time. In this arrangement, the waiting time can be set according to the characteristics of the printing medium being used and the characteristics of ink being used. In this case, by reducing the waiting time for the second image in accordance with the period elapsed since finishing the first image paring the second image, the print processing is prevented from taking a long time unnecessarily. This arrangement is effective especially in the case where the printer begins printing the images for the back surfaces of a plurality of printing medias after finishing printing the image for the front surfaces of all of printing medias, since the time required for printing the image on the front surfaces of the following printing medias is counted as the waiting time.

In the case where the printer as a controlled system of the printer control unit is a printer of the type that the advancement of the printing medium fed by the rotation of the feeding roller is suspended by the registering roller located forward of the printing medium, it is also possible to include the instruction for rotating the registering roller in the direction to move the printing media backward and rotating the feeding roller according to the rotation of the registering roller in the paper feed command for delaying the start of feeding the printing medium for printing the second image. In this arrangement, since the printing medium having images on the front surfaces are fed toward the registering roller, but the leading edges thereof are flipped by the reverse rotation of the registering rollers, thus skew of the printing media on the feed is corrected, and consequently the position of the leading edges of the printing media with respect to the print head is registered. Therefore, the image can be printed at the proper position on the back surface of the printing medium having the image printed on the front surface, and thus high-quality image can be printed at the proper position on both surfaces of the printing medium.

In order to achieve the second object described above, the present invention provides a storage medium including an operation program for the printer control unit stored therein.

In other words, the present invention provides a storage medium having a program stored for issuing by a printing control unit a command to be supplied to the printer which is able to print the page image on both surfaces of a printing medium, the program is for making the printer control unit execute:

a detecting process for detecting information on the quantity of ink used for printing the first image which is to be printed ahead of the other one of the pair of images having consecutive page numbers;

a mode designation receiving process for receiving the designation of double-side printing mode in which both surfaces of the printing medium are the target surfaces to be printed;

a command generating process for generating a command for delaying the start of feeding the printing medium, upon receipt of the designation of the double-side printing mode, for printing the second image as long as the period of time corresponding to the waiting time according to information on the first image paring with the second image detected by the detecting means; and a command issuing process for issuing the command generated by the command generating process, as the command to be supplied to the printing mechanism.

In addition, in order to achieve the third object, the present invention provides a printer control unit for issuing the command to be supplied to the ink jet printer, comprising:

mode designation means for receiving the designation of the mode between double-side printing mode and one-side printing mode;

transmit-receive means for making an inquiry about the ink jet printer whether or not the double-side printing is possible, receiving a response to the inquiry, and issuing the generated printing command as the command, when double-side printing mode is designated by the mode designation means; and printing command generating means for:

when the transmit-receive means received a response representing that double-side printing is possible, generating a printing command for double-side printing mode as the printing command to be issued by the transmit-receive means, and when the transmit-receive means received other responses, generating a first printing command for one-side printing mode relating to one of the odd-numbered pages and the even-numbered pages successively as the printing command to be issued by the transmit-receive means, and then generating a second printing commands for one-side printing mode relating to the other one of the odd-numbered pages and the even-numbered pages successively as the printing command to be issued by the transmit-receive means.

When the transmit-receive means terminated the transmission of all the first printing command, the transmit-receive means makes an inquiry about whether or not the ink jet printer has executed printing according to all of the first printing command; and when it is arranged to accept the response to the inquiry, there may be provided output means for issuing an output indicating that printing according to all the first printing commands has finished.

The printer control unit may comprise;

margin setting means for receiving the margin settings of at least one of the odd-numbered page and the even-numbered page; and automatic remaining margin setting means for setting the margins in such a manner that, when double-side printing mode is designated by the mode designation means and the margin for one of the odd-numbered page and the even-numbered page is set by the margin setting means, the right margin of one of the pages of which the margins are not set is set to the same width as the left margin of the other page of which the margins are set, and the left margin of one of the pages of which the margins are not set is set to the same width as the right margin of the other page of which the margins are set.

Alternatively, the printer control unit may comprise:

drawing command generating means for generating a drawing command which serves as a source when the printing command generating means generates the printing command, and specifying the printing area on the printing medium for printing based on the printing command; and margin setting means for setting margins on the printing medium for executing a printing job based on the printing command. In this case, it is desired that the printing command generating means comprises:

drawing means for expanding the drawing command into an image; and drawing control means for controlling the drawing means in such a manner that when a part of the printing area specified by the drawing command generating means is overlapped with the margin as a result of setting the margin by the margin setting means, the drawing command for one page is expanded into a downsized image by the drawing means so that the image for a page is accommodated within the area that is not overlapped with the margin in the printing area. There may be provided output means for outputting one of massages indicating that the image will be downsized, and a message to inquire whether the image may be downsized or not before rasterizeing the drawing command for a page into a downsized image. In the case where the printing area is rectangular, preferably, the drawing control means makes the drawing means rasterize the drawing command for one page into a downsized image without changing the aspect ratio of the printing area.

It is also possible to provide output means that output the massage for confirming whether or not ink for double-side printing is installed in the ink jet printer when double-side printing mode is designated by the mode designation means.

The printer control unit may comprise:

reversing time setting means for setting a reversing time that is required for the printing medium to be reversed after printing on one of surfaces of the printing medium is finished and be ready for printing on the other surface thereof, and transmitting the reversing time via the transmit-receive means when the ink jet printer is in double-side printing mode. In such a case, there may be provided:

printing medium type designation means for designating the type of the printing medium; and storage means for storing the relation between the type of the printing medium that can be specified by the printing medium type specifying means and the reverse time, so that when the type of the printing medium is specified by the printing medium type specifying means, the reverse time setting means references the stored contents in the storing means and sets the reverse time corresponding to the type of the printing medium.

The second embodiment of the present invention for achieving the third object described above provides a printer system comprising this printer control unit.

The third embodiment of the present invention for achieving the third object described above provides a printer control unit for outputting a command for transmitting to the ink jet printer comprising:

mode designation means for designating the mode between double-side printing mode and one-side printing mode;

binding margin designation means for designating the position of binding margin whether it is in the right/left of the printing medium, or in the top/bottom of the printing medium;

transmit-receive means working in such a manner that when double-side printing mode is designated by the mode designation means, it inquires whether or not the ink jet printer is able to execute double-side printing, receives the response to the inquiry, and issues a generated printing command; and printing command generating means working in such a manner that:

when the position of binding margin is specified to be the right/left of the printing medium by the binding margin designation means, and the transmit-receive means receives a response indicating that double-side printing is possible, a printing command for printing the upright printing image, which is a command for double-side printing mode, is generated as the printing command to be issued by the transmit-receive means for one of the odd-numbered pages and the even-numbered pages, and a printing command for printing the inverted printing image (image made by inverting the upright printing image by 180°) is generated as the printing command to be issued by the transmit-receive means for the other one of the odd-numbered pages and the even numbered pages;

when the binding margin position is designated to be the right/left of the printing medium by the binding margin position designation means and the transmit-receive means receives the response indicating that double-side printing is not possible, a printing command for printing the upright printing image, which is a command for one-side printing mode, is generated in succession as the printing command to be issued by the transmit-receive means for one of the odd-numbered pages and the even-numbered pages, then a printing command for printing the upright printing image, which is a command for one-side printing mode, is generated in succession as the printing command to be issued by the transmit-receive means for the other one of the odd-numbered pages and the even-numbered pages;

when the binding margin position is specified to be the top/bottom of the printing medium by the binding margin position designation means and the transmit-receive means receives the response indicating that double-side printing is possible, a printing command for printing the upright printing image, which is a command for one-side printing mode, is generated as the printing command to be supplied by the transmit-receive means for both of the odd-numbered pages and the even-numbered pages; and when the binding margin position is specified to be the top/bottom of the printing medium by the binding margin position designation means and the transmit-receive means receives to the response indicating that double-side printing is not possible, a printing command for printing the upright printing image, which is a command for one-side printing mode, is generated in succession as the printing command to be issued by the transmit-receive means for one of the odd-numbered pages and the even-numbered pages, then a printing command for printing the inverted printing image, which is one-side printing mode, is generated in succession as the printing command to be issued by the transmit-receive means for the other one of the odd-numbered pages and the even-numbered pages.

In order to achieve the third object, the fourth embodiment of the present invention provides a printer system comprising this printer control unit.

In order to achieve the third object, the fifth embodiment of the present invention provides an ink jet printer that jets (ejects) ink from the printing head to print on a printing medium according to the printing command supplied from the printer control unit, wherein a reversing mechanism for reversing the printing medium after one of the surfaces of the printing medium is printed, and guiding the printing medium to the position where the other surface of the printing medium faces toward the printing head permits installation, comprising:

installation detecting means for detecting whether or not the printing medium reversing mechanism is installed;

transmit-receive means working in such a manner that:

when the printing command and the inquiry about whether or not double-side printing is possible are received from the printer control unit: and when the installation detecting means detects the installation of the printing medium reversing mechanism, a response indicating that double-side printing is possible is returned, and when the installation detecting means does not detect the installation of the sheet reversing mechanism, a response indicating that double-side printing is not possible is returned.

The ink jet printer may be provided with the reversing mechanism.

In order to achieve the third object, the sixth embodiment of the present invention provides a printer system comprising:
the ink jet printer; and
a printer control unit according to the first or third embodiment for achieving the third object.

In order to achieve the third object, the seventh embodiment of the present invention provides an ink jet printer for jetting ink from the printing head and printing on a printing medium according to the printing command from the printer control unit, comprising;

a reversing mechanism for reversing the printing medium after one of the surfaces of the sheet is printed, and guiding the printing medium to the point where the other surface of the sheet faces toward the printing head; and transmit-receive means for receiving the printing command from the printer control unit and the inquiry about whether or not double-side printing is possible, and then returning a response indicating that double-side printing is possible.

In order to achieve the third object, the eighth embodiment of the present invention provides a printer system comprising;
the ink jet printer; and
a printer control unit according to the first or the third embodiment in order to achieve the third embodiment.

In order to achieve the third object, the ninth embodiment of the present invention provide a storage medium having a operation program of the printer control unit including a transmit-receive means for transmitting a command to an ink jet printer stored therein, comprising:

a mode designation procedure for receiving a designation of the mode between double-side printing mode and one-side printing mode;

a transit/receive control procedure for making an inquiry whether of not the ink jet printer is able to execute double-side printing when double-side printing mode is designated in the mode designation procedure and receiving a response to the inquiry; and a printing command generating procedure comprising steps of:

generating a printing command for double side printing mode and outputting the printing command from the transmit-receive means when the transmit-receive means receives a response indicating that double-side printing is possible;

generating a first printing command, which is a printing command for one-side printing, relating to one of the odd-numbered page and the even-numbered page in succession and outputting each first printing command from the transmit-receive means when the transmit-receive means receives the response indicating that double side printing is not possible; and generating a second printing command, which is a printing command for one-side printing, relating to the other page in succession and outputting each second printing command from the transmit-receive means when transmission of all the first printing command is finished.

The program of the storing medium may be constructed in such a manner that;

in case where double-side printing mode is designated in the mode designation procedure and the transmit-receive means receives to the response indicating that double-side printing is not possible, an inquiry about whether or not the printing job according to the first printing command has finished is made via the transmit-receive means after transmission of the first printing command is finished in the transmit-receive control procedure, in case where the transmit-receive means accepted the response from the ink jet printer indicating that the printing job according to the first printing command has finished, the massage indicating that the printing job according to the first printing command has finished is indicated so that a user is prompted to give an instruction to execute a printing job according to the second printing command is given.

The program of this storage medium may comprise:

a margin setting procedure for receiving the margin setting for one of the odd-numbered pages and the even-numbered pages;

automatic remaining margin setting means for setting the margins in such a manner that, when double-side printing mode is designated by the mode designation means and the margin for one of the odd-numbered page and the even-numbered page is set by the margin setting procedure, the right margin of one of the pages of which the margins are not set is set to the same width as the left margin of the other page of which the margins are set, and the left margin of one of the pages of which the margins are not set is set to the same width as the right margin of the other page of which the margins are set.

The program of the storage medium may comprise:

a displaying procedure for displaying the printing medium of the odd-numbered page and the printing medium of the even-numbered page, and displaying the margin set by the margin setting means and the automatic remaining margin setting means.

When the program of the storage medium, which includes a margin setting procedure for setting the margin in the printing medium for printing in accordance with the printing command, is a program to be used in association with the program including a drawing command generating procedure comprising steps of generating a drawing command which serves as a source for generating the printing command in the printing command generating procedure, the printing command generating procedure preferably includes:

a drawing procedure for rasterizing the drawing command into an image; and a drawing control procedure for controlling the drawing means in such a manner that when a part of the printing area specified by the drawing command generating means is overlapped with the margin set by the margin setting means, the drawing command for one page is rasterized into a downsized image so that the image for one page is accommodated within the area that is not overlapped with the margin in the printing area.

The program of this storing medium may comprise:

a display control procedure for displaying the confirmation to the effect whether or not ink for double-side printing is installed to the ink jet printer when double-side printing mode is designated in the mode designation procedure.

The program of this storing medium may comprise:

a reversing time setting procedure for setting a reversing time that is required for the printing medium to be reversed after printing on one of surface of the printing medium is finished and be ready for printing on the other surface thereof when the ink jet printer is in double-side printing mode.

Constructions described thus far have flexibility in combination as much as possible, and all the combinations are included in the present invention. Though the specific combinations are described below as embodiments of the invention, it is for the purposes of showing examples, and the form having eliminated a part thereof is also included in the present invention. All the constructions shown specifically in the following description are a specific concept included in a generic concept.

BRIEF DESCRIPTION OF THE DRAWINGS

FIG. 8 is a conceptual diagram showing a data structure of the waiting time control table according to an embodiment of the present invention;

FIG. 9 is a conceptual diagram showing a data structure of the waiting roller rotational number control table according to an embodiment of the present invention;

FIG. 10 is a conceptual diagram showing a data structure of the waiting time control table according to an embodiment of the present invention;

FIG. 11 is a conceptual diagram showing a data structure of the waiting time control table according to an embodiment of the present invention;

DESCRIPTION OF THE PREFERRED EMBODIMENTS

Figure 1:
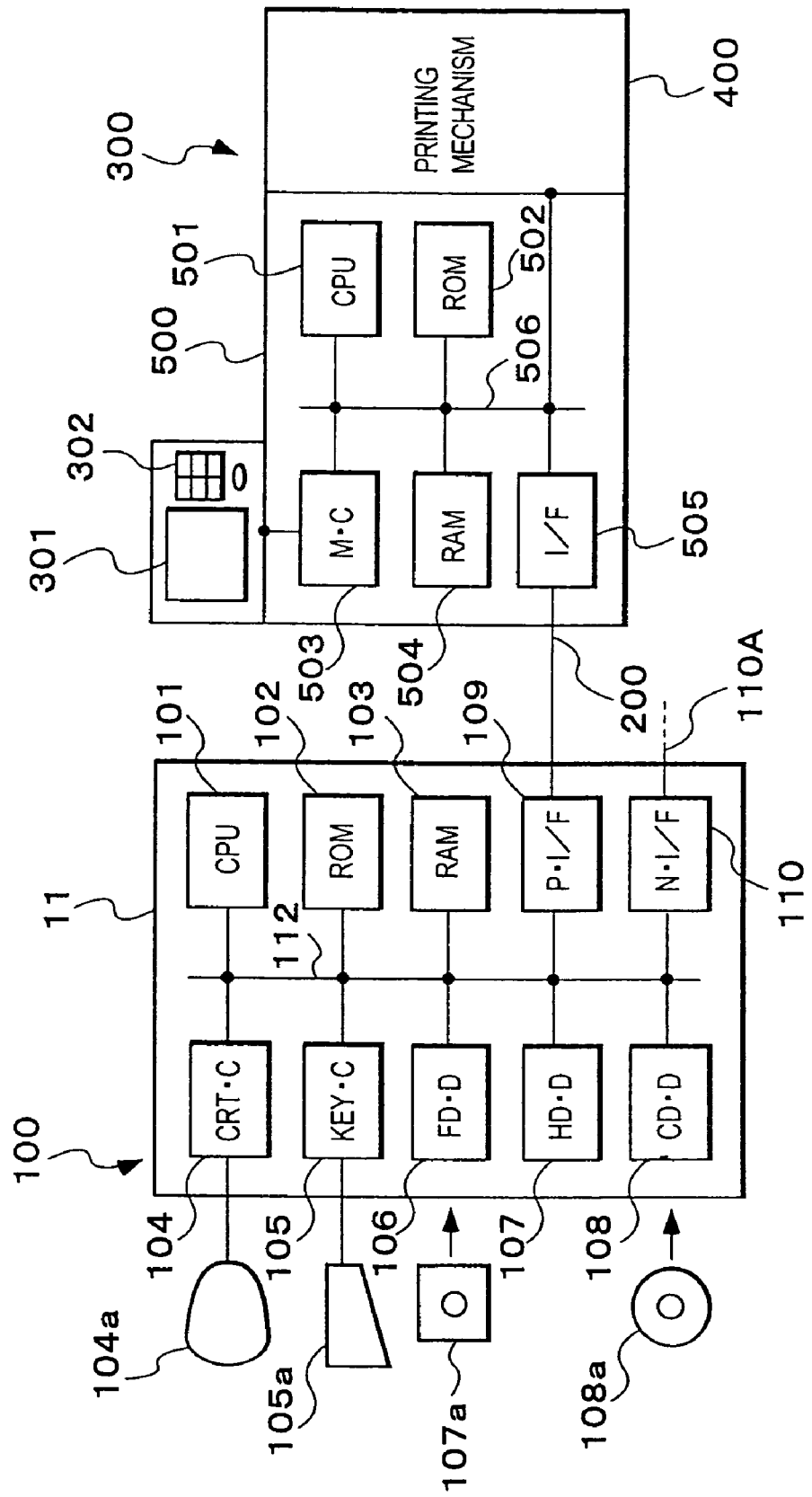
FIG. 1 is a schematic block diagram of a printer system according to an embodiment of the present invention.

Referring now to the drawings, an embodiment of the present invention will be described.

First of all, a structure of a printing system according to the first embodiment of the present invention will be described. What is shown here is a structure of the system including a printer that is able to print on both surfaces of printing media such as a cut sheet paper by reversing the sheets manually by the user.

The printing system according to this embodiment comprises, as shown in FIG. 1, a host 100, a printer 300, a cable 200 connecting between the host 100 and the printer 300.

The host 100 has a hard ware structure as a normal information processor. More specifically, an enclosure includes a Central Processing Unit (CPU) 101, a Read-only Memory (ROM) 102, a random-access RAM 103, a display controller 104, a keyboard controller 105, a floppy disk drive 106, hard disk 107, CD-ROM drive 108, a printer interface 109 to which a cable 200 is connected, a network interface 110 to be connected to the communication line 110a as needed, and a bus 112 for transmitting data therebetween. In addition, as external input-output devices, a keyboard 105a is connected to the keyboard controller 105 and a display unit 104a is connected to the display controller 104. In the hard disk 107 integrated in the host 100, various application programs are installed in advance from the storage media such as the floppy disk 107a, or the CD-ROM 108a. For example, a drawing program for producing a page image to be printed by the printer 300, and printer control program defining a printer control process described later are also included. The ROM 102 includes various control programs stored therein, as a matter of course.

Figure 2:
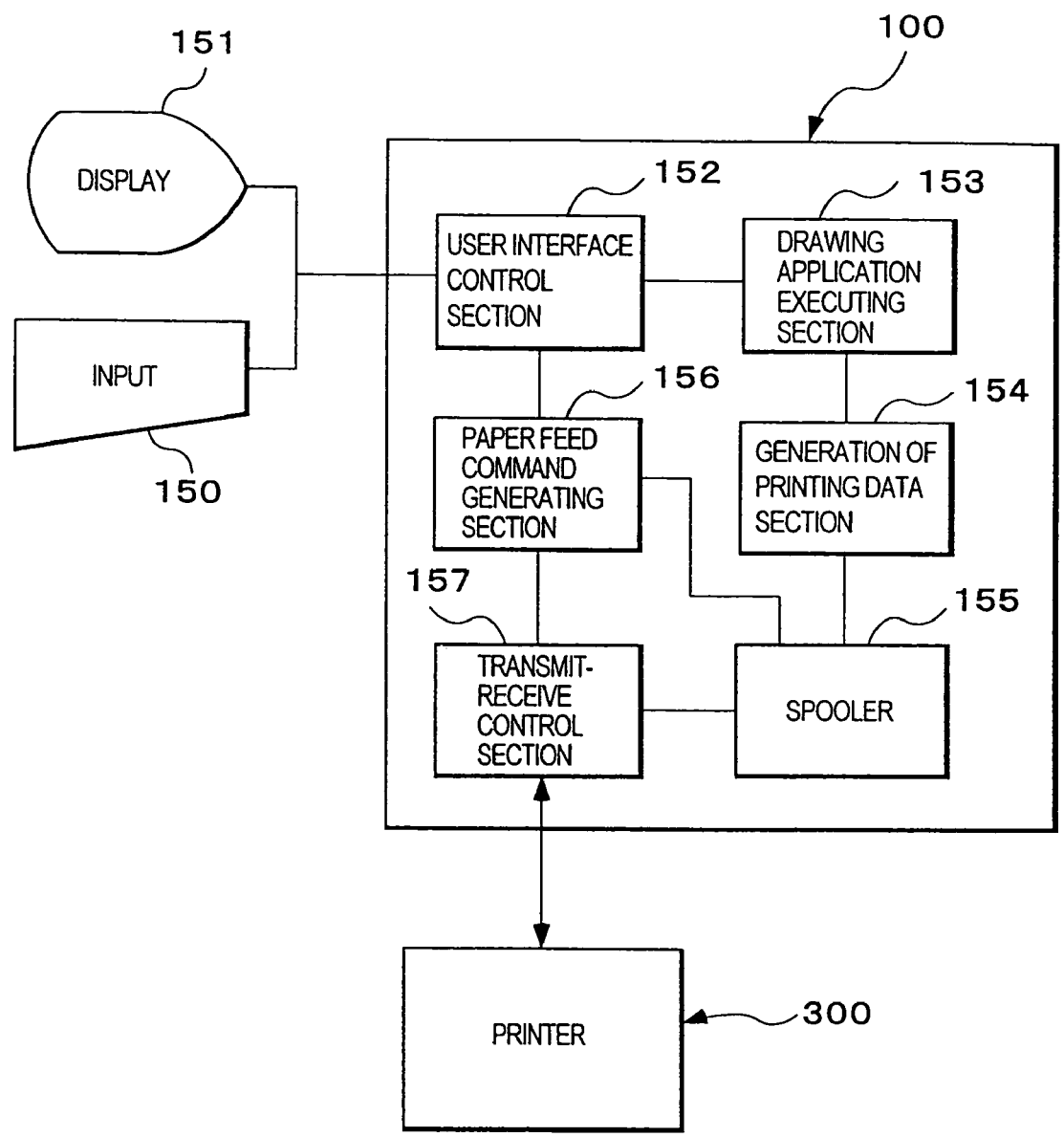
FIG. 2 is a functional block diagram of the host according to an embodiment of the present invention.

In the host 100, a functional structure for executing a printer control process described later is implemented by such a hard ware structure and a program and data loaded on the memory. More specifically, as shown in FIG. 2, an input section 150 through which the user enters data, a display section 151 for displaying various display screens, a user interface control processing section 152 for controlling the input section 150 and the display section 151, drawing application executing section 153, a print data creating section 154 for converting print data from the drawing application executing section 153 into print data for the printer, a paper feed command generating section 156 for generating a paper feed command for the printer 300, a spooler 155 for spooling print data from the print data creating section 154 and a paper feed command from the paper feed command generating section 156, and a transmit-receive control section 157 for controlling data transmission with the printer 300 are implemented.

The enclosure of the printer 300 contains equipment constituting the printing mechanism 400 for executing the printing process and equipment constituting the control system 500 for controlling the printer. Outside of the enclosure is provided with a liquid crystal monitor 301 and the control panel 302.

Figure 3:
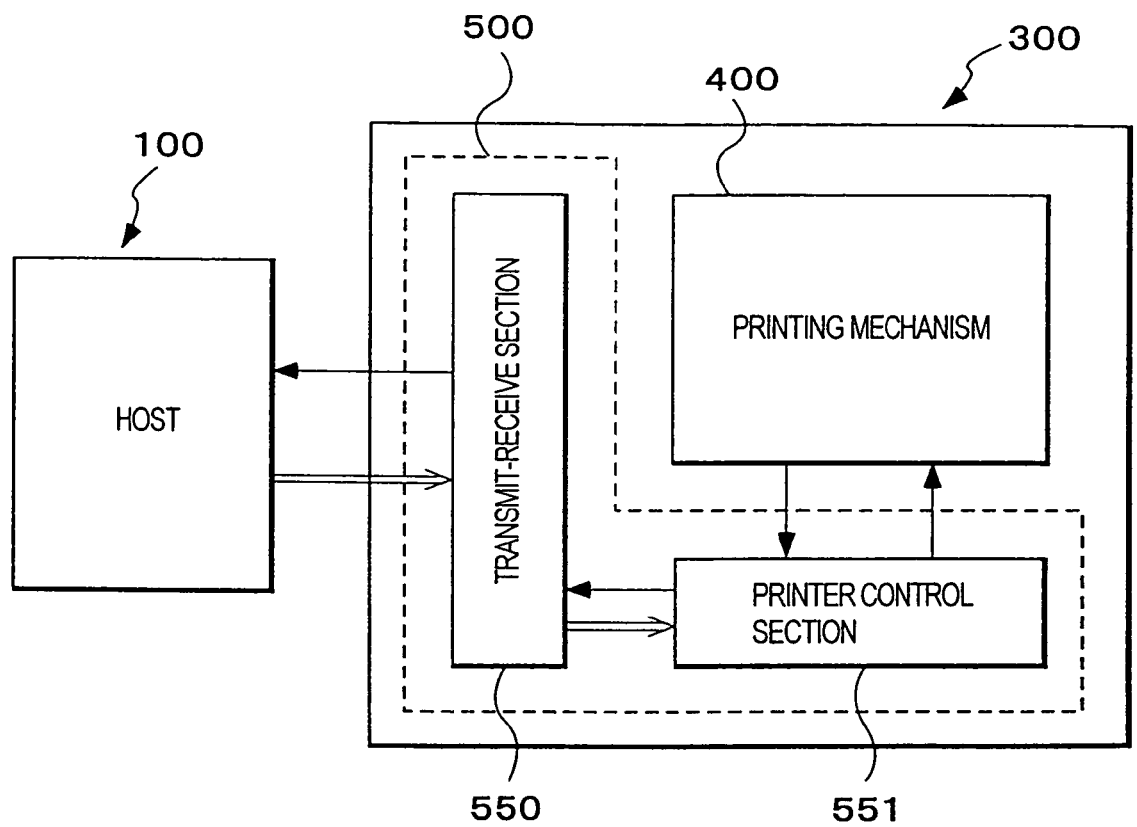
FIG. 3 is a functional block diagram of the ink jet printer according to an embodiment of the present invention.

Equipment constituting the control system 500 includes a CPU 501, a ROM 502, a RAM 504, an input-output interface 505 to which the cable 200 is connected, a panel controller 503 for controlling the liquid crystal monitor 31 and the control panel 32, and a bus 506 for transmitting data therebetween. When printing the page image, as shown in FIG. 3, a transmit-receive control section 550 for controlling the data transmission/reception with the host 100, and a printer control processing section 551 for making the printing mechanism 400 execute the page image printing process according to the printing request from the host 100 are implemented.

Figure 4:
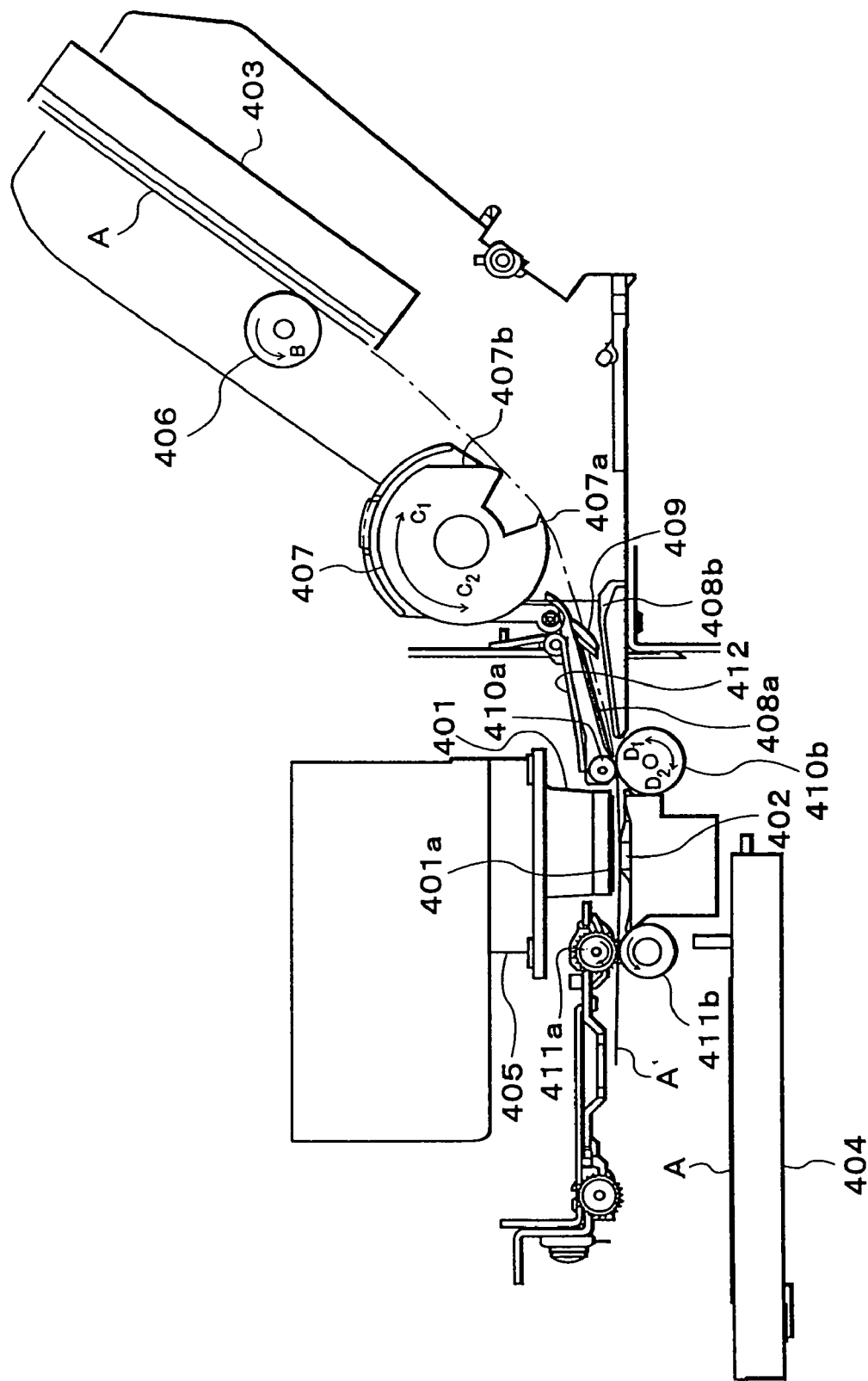
FIG. 4 is a schematic block diagram showing the internal construction of the printing mechanism of the ink jet printer according to an embodiment of the present invention.

Equipment constituting the printing mechanism 400 includes, as shown in FIG. 4, a print head 401, detachable/attachable ink cartridges 405 for respective colors, a head carrying unit (not shown), a platen 402, a paper feeding tray 403, a paper receiving tray 404, an ink circulating unit 405, a cut paper conveying unit, and a high-voltage generating circuit.

The head carrying unit reciprocates the print head 401 across the cut paper A which is sent intermittently by the cut paper conveying unit described below during the page image printing process. To this end, the head carrying unit 401 comprises a carriage having the print head 401 and the ink cartridge 405 mounted thereon, a driving belt for reciprocating the carriage in the main scanning direction, two pulleys, a stepping motor for rotating the driving pulley according to the control instruction from the printer control section 551 of the control system 500. The ink discharging port 401a of the print head 401 and the platen 402 are facing each other with a prescribed clearance t formed therebetween. The sheet conveying unit conveys the cut paper A through the clearance t. Therefore, the cut paper conveying unit comprises a take-up roller 406 for taking up the cut paper A from the paper feeding tray 403, upper and lower guide plates 408a, 408b for guiding the cut paper A between the ink discharging port 401a of the print head 401 and the platen 402, a feeding roller 407 for feeding the cut paper A between the upper and lower guide plates 408a, 408b, a sheet detecting sensor 409 provided between the upper and lower guide plates 408a, 408b, upper and lower registering rollers 410a, 410b for registering the leading edge of the cut paper A having passed between the upper and lower guide plates 408a, 408b, the upper and lower discharging rollers 411a, 411b for pulling the cut paper A out of the clearance t between the ink discharging port 401a of the print head 401 and the platen 402, and a plurality of stepping motors (not shown) for rotating each roller according to the control instruction from the printer control section 551 of the control system 500. The upper registering roller 410a is pressed against the lower registering roller 410b by a resilient force of the spring 412.

Next, the paper feed command generated by the paper feed command generating section 156 will be described. Hereinafter, the surface of a cut paper on which the page image is printed first is referred to as the front surface, and the surface on which the page image is printed after printing on the front surface has finished is referred to as the back surface.

The paper feed command generating section 156 generates two types of paper feed commands (normal paper feed command, back surface paper feed command) to be issued to the printer.

The normal paper feed command is a command for operating the sheet conveying unit of the printer as follows.

When the normal paper feed command is issued, the rotation of the upper and lower registering rollers 410a, 410b stops, and the take-up roller 406 and the feeding roller 407 start rotating in prescribed directions (directions B and $C_1$ to feed the cut paper A) at prescribed speeds, whereby the cut paper on top A which is in contact with the outer periphery of the take up roller 406 is taken up from the paper feed cassette 403 and passed to the rotating feeding roller 407. Then the cut paper A is fed between the upper and lower guide plates 408a and 408b and the leading edge of the cut paper abuts the nip between the upper and lower registering rollers 410a, 410b under suspension of rotation.

When a prescribed period of time $\Delta s_1$ has elapsed since the sheet detecting sensor 409 detected the passage of the cut paper, the feeding roller 407 stops rotating. At this time, the feeding roller 407 is oriented so that the notch 407a is facing toward the cut paper A, and the cut paper A is fed between the upper and lower guide plates 408a, 408b to the extent such that a slack is formed due to the abutment with the upper and lower registering rollers 410a and 410b, whereby the whole portion of the leading edge of the cut paper is fixedly caught between the upper and lower registering rollers 410a, 410b during suspension thereof.

In this state, the upper and lower registering rollers 410a, 410b start rotating in the prescribed direction (direction $D_1$ to feed the cut paper A) at a prescribed speed, whereby the cut paper A caught between the upper registering roller 410a, 410b start advancing again, and is passed between the upper and lower discharging rollers 411a, 411b. In this way, the skew of the cut paper A being conveyed is corrected by allowing the whole part of the leading edge of the cut paper A to be caught fixedly between the upper and lower registering rollers 410a, 410b, and feeding the cut paper A again by the upper and lower registering rollers 410a, 410b.

Next, the upper and lower registering rollers 410a, 410b stop rotating at a prescribed timing, and then the upper and lower discharging rollers 411a, 411b start intermittent rotation in a prescribed direction (the direction to feed the cut paper A to the paper receiving tray 404), whereby the cut paper A advances while rotating the upper and lower registering roller 410a, 410b by friction, and then is discharged to the paper receiving tray 404 eventually.

With the normal sheet feed command, when the front surface is printed in the normal one-side printing process or the double-side printing process, the cut paper A can be correctly registered with respect to the print head 401. Therefore, the ink jet printer can print the page image on the correct position on the cut paper.

On the other hand, the back surface paper feed command is a command for operating the sheet conveying unit of the printer as follows.

When the back surface paper feed command is issued, the rotation of the upper and lower registering rollers 410a, 410b stops. Then after a prescribed period of waiting time $\Delta t$ has elapsed, the take up roller 406 and the feeding roller 407 start rotating in the prescribed directions (directions B, $C_1$ to feed the cut paper A) at prescribed speeds, whereby the cut paper on top A is taken up from the paper feed cassette 403 with delay of waiting time $\Delta t$ in comparison with the case where the normal paper feed command is issued.

After a prescribed time $\Delta s_1$ has elapsed since the sheet detecting sensor 409 detected the passage of the cut paper, the upper and lower registering rollers 410a, 410b start rotating in the direction $D_2$ to push back the cut paper A. However, in this case, in contrast to the case where the normal paper feed command is issued, the feeding roller 407 does not stop the rotation in the direction $C_1$ to feed the cut paper A. Therefore, the cut paper A is pushed out toward the upper and lower registering rollers 410a, 410b while the leading edge is pushed back by the upper and lower registering rollers 410a, 410b. Then, at a prescribed timing, the upper and lower registering roller 410a, 410b and the feeding roller 407 stop rotating.

Figure 6A:
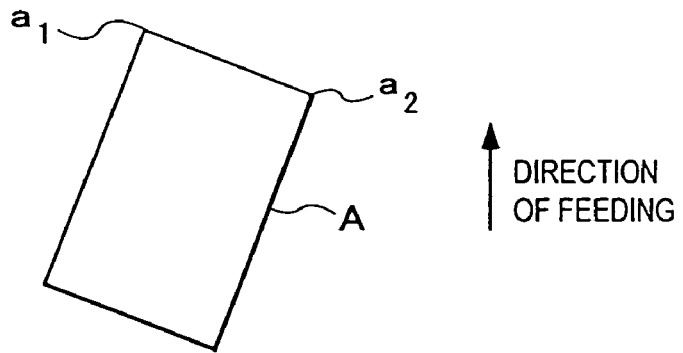
FIGS. 6A to 6C are drawings illustrating a skew correction of a cut sheet paper being fed.
Figure 6B:
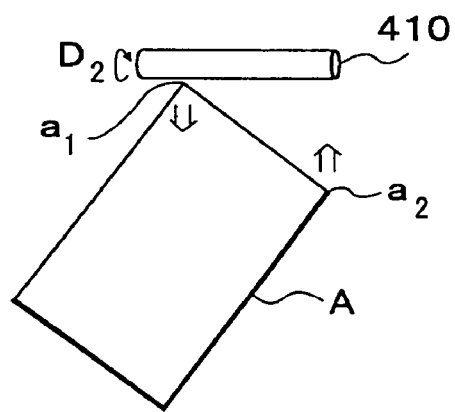

As shown in FIG. 6A, when the cut paper A is skewed, one of the corners $a_1$ of the leading edge of the cut paper reaches the upper and lower registering rollers 410a, 410b first as shown in FIG. 6B, but the corner $a_1$ is pushed back by the reverse rotation $D_2$ of the upper and lower registering roller 410a, 410b. Since the feeding roller 407 continues to feed the cut paper A, the other corner $a_2$ of the leading edge of the cut paper finally reaches to the upper and lower registering roller 410a, 410b.

Figure 6C:
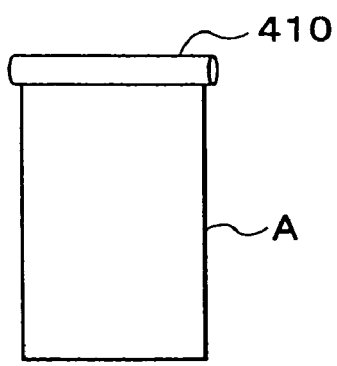

Therefore, even in the case of the cut paper with the image printed on the front surface (such as a cut paper increased in weight as much as the weight of ink, or a cut paper deformed by irregular waves or the like), a sufficient slack is formed so that the whole part of the leading edge thereof reliably abuts the nip between the upper and lower registering rollers 410a, 410b (hereinafter referred to as cut paper abutment). When the upper and lower registering rollers 410a, 410b are stopped in such a situation, as shown in FIG. 6C, the whole part of the leading edge of the cut paper A is caught between the upper and lower registering rollers 410a, 410b, thereby correcting the skew of the cut paper A.

In this way, when the whole part of the cut paper A is caught between the upper and lower registering rollers 410a, 410b, the upper and lower registering roller 410a, 410b start rotating in a prescribed direction (direction $D_1$ to feed the cut paper A) at prescribed speeds. At the same time, the feeding roller 407 starts rotating in the reverse direction (direction $C_2$ to push back the cut paper A) at a prescribed speed, whereby the leading edge of the cut paper A is passed from the upper and lower registering rollers 410a, 410b to the upper and lower discharging rollers 411a, 411b, and the following edge is retracted by the claw 407a of the feeding roller 407 (hereinafter referred to as sheet retraction). Though there may be the case where the leading edge of the second top cut paper is pulled out from the paper feed tray 403 due to friction with the cut paper on top A which is fed out from the paper feed tray 403, since the following edge of the cut paper on top A is pushed back toward the paper feed tray 403, the second top cut paper is pushed back to the paper feed tray 403 as well.

Then, at a prescribed timing, the rotation of the upper and lower registering rollers 410a, 410b and the feeding rollers stops, and the upper and lower discharging rollers 411a, 411b start the intermittent rotation in the prescribed direction (the direction feeding the cut paper A to the paper receiving tray 404). At this time, the notch 407a of the feeding roller 407 is facing toward the cut paper A, whereby the cut paper A moves forward while rotating the upper and lower registering rollers 410a, 410b by friction and eventually is discharged on the paper receiving tray 404.

With the back surface paper feed command, even in the case of the cut paper A having the image printed on the front surface, the leading edge thereof can be registered with respect to the print head. Therefore, the ink jet printer that is able to print on the both surfaces can print the page image at the correct position even on the back surface of the cut paper A having the image already printed on the front surface. Since there is provided a prescribed length of waiting time $\Delta t$ before feeding the cut paper A, printing of the page image on the back surface of the cut paper A can be started after the ink on the front surface of the cut paper A has dried completely. Therefore, even when the front surface of the cut paper comes in contact with the roller, the quality of the page image on the front surface of the cut paper is maintained.

Figure 5:
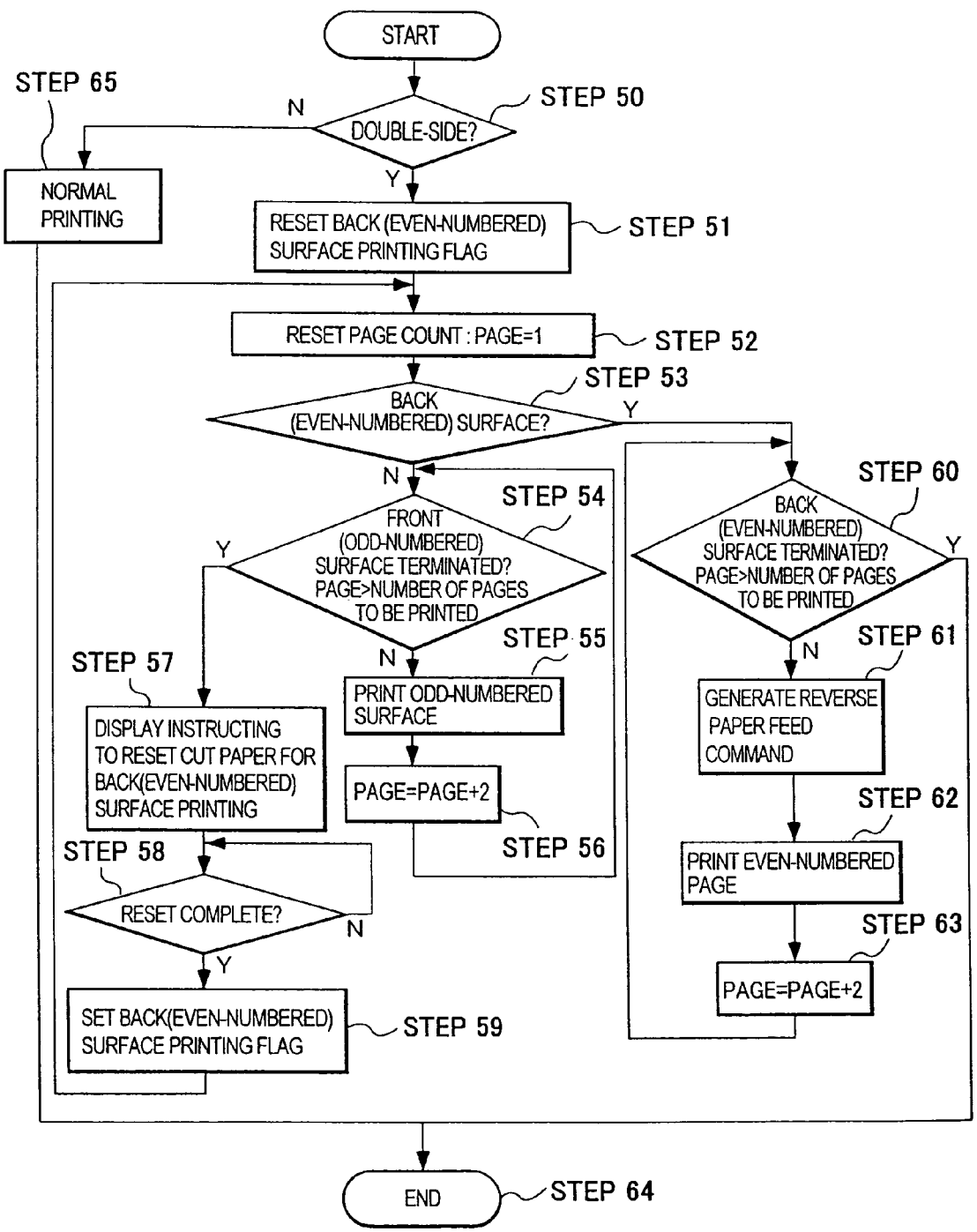
FIG. 5 is a flow chart showing the flow of printer control processes according to an embodiment of the present invention.

Therefore, as far as the host 100 issues these two types of paper feed command appropriately, the ink jet printer that is able to print the both surfaces can print the page image of high quality on the correct position on both surfaces of the cut paper. Referring to FIG. 5, the printer control process to be executed by the host 100 will now be described referring to FIG. 5.

After the user enters a designation of the printing mode followed by a print execution command via the input section 150, the user interface control section 152 accepts the designation of the printing mode from the user and determines whether or not it is double-side printing mode (step 50).

At this time, when the user interface control section 152 determines that the printing mode designated by the user is the printing mode other than double-side printing mode, the print data creating section 154, etc. execute the normal one-side printing process. In other words, print data from the drawing application executing section 153 is converted into the print data for the printer sequentially, and print data is transmitted together with the normal paper feed command to the printer 300 in ascending order of page number (step 65), whereby the printer 300 prints the page images on one side of the cut paper A in ascending order of page number. The printer control process in the host 100 is also terminated (step 64).

On the other hand, when the user interface control section 152 determines the printing mode designated by the user is double-side printing mode, the paper feed command generating section 156 resets the back surface printing flag F (step 51), and sets the initial value (Page=1) to the page counter Page (step 52) in order to start printing of the page image on the front surface of the cut paper A.

Then the paper feed command generating section 156 determines which one of the odd-numbered pages or the even-numbered pages is to be printed, from the setting value of the back surface printing flag F (step 53), then the process according to the result of determination is executed. More specifically, when the initial value (for example zero) is set to the back surface printing flag F, it is determined to be the initiation of printing of the odd-numbered pages and thus the first process shown below (step 54 to step 59) is executed. On the other hand, when the value other than zero (for example 1) is set thereto, it is determined to be the initiation of printing of the even-numbered pages and the second process shown below (step 60 to step 63) is executed.

(1) The First Process (Step 54 to Step 59)

When determined to be the initiation of printing of the odd-numbered pages, the paper feed command generating section 156 determines whether or not the setting value of the page counter Page exceeds the total number of pages to be printed (step 54).

When the setting value of the page counter Page is smaller than the total number of pages to be printed, the print data creating section 154 creates print data for one odd-numbered page for the printer. More specifically, it converts into RGB image data the unconverted print data supplied from the drawing application executing section 153 for the smallest odd-numbered page (1,3,5, ... ). Then, after the RGB data for the odd-numbered page is subjected to various processes such as a color converting process, it is converted into CMYK binary coded image data. CMYK binary coded image data is eventually converted into print data for the printer.

The paper feed command generating section 156 generates a normal paper feed command each time when the print data creating section 154 creates print data for one page. The normal paper feed command thus generated and print data for one page are temporarily stored in the spooler 155 as a spool file, and then forwarded to the printer 300 via the transmit-receive control section 157. The printer 300 that has received the normal paper feed command and the print data executes printing of the odd-numbered page image on the front surfaces of each cut paper A (step 55).

After that, when the host receives "print completion" message from the printer 300, the paper feed command generating section 156 increments the setting value of the page counter Page by two, and the transmit-receive control section 157 deletes the transmitted print data for the odd-numbered page and the normal paper feed command from the spooler 155 (step 56).

The process (step 55, step 56) is repeated until the setting value of the page counter Page exceeds the total number of pages to be printed (step 54). When the setting value of the page counter Page exceeds the total number of pages to be printed, the user interface control section 152 displays "reset sheets" message on the display 151 (step 57). This message is for reminding the user to reverse the stack of cut papers on the paper receiving tray 404 and reset them on the paper feed tray 403.

When the user who has followed the message entered "sheet reset complete" command via the input section 150 and the user interface control section 152 detected it (step 58), the paper feed command generating section 156 sets the prescribed value (for example one) to the back surface printing flag F (step 59), and then the process is returned to the step 52.

(2) The Second Process (Step 60 to Step 63)

When determined to be the initiation of printing of the even-numbered page, the paper feed command generating section 156 determines whether or not the setting value of the page counter Page exceeds the total number of pages to be printed (step 60).

When the setting value of the page counter Page is smaller than the total number of pages to be printed, the print data creating section 154 creates print data for one even-numbered page for the printer as in the case of the creation of print data for a odd-numbered page. The paper feed command generating section 156 generates the back surface paper feed command every time when print data for one even-numbered page is generated (step 61). The back surface paper feed command thus generated and print data for one page are temporarily stored in the spooler 155 as a spool file, and transmitted to the printer 300 via the transmit-receive control section 157. The printer 300 that has received the back surface paper feed command and the print data executes printing of the even page image on the back surface of each cut paper A (step 62).

After that, when the host receives "print completion" message from the printer 300, the paper feed command generating section 156 increments the setting value of the page counter Page by two, and the transmit-receive control section 157 deletes from the spooler 155 the transmitted print data for the even-numbered page and the back surface paper feed command (step 63).

The process (step 61 to step 63) is repeated until the setting value of the page counter Page exceeds the total number of pages to be printed. When the setting value of the page counter Page exceeds the total number of pages to be printed, the printer control process on the host 100 is completed (step 64).

According to the printer control process as described above, since the two types of paper feed commands described above are appropriately given to the ink jet printer that is able to print on both surfaces, the page images of high quality can be printed on the correct position on both surfaces of cut paper.

Though the back surface paper feed command described above instructs the printer 300 the direction of rotation of the upper and lower registering rollers 410a, 410b, and the feeding roller 407, it does not change the speed of rotation as needed. Therefore, the upper and lower registering rollers 410a, 410b and the feeding roller 407 of the printer 300 rotate at almost constant speed in all the directions of $C_1$, $C_2$, $D_1$, and $D_2$. Though the back surface command described above instructs the printer 300 to wait for a prescribed waiting time Δt prior to the paper feed for printing on the back surfaces, it does not change the length the waiting time as needed. Therefore, the printer 300 always waits for a constant waiting time before starting the paper feeding operation for printing on the back surfaces of the cut paper.

However, the construction of the ink jet printer of the present invention does not have to be as described so far. For example, it is also possible to arrange so that the length of the waiting time and the speed of rotation of the upper and lower registering rollers 410a, 410b and the feeding roller 407 can be controlled according to the quantity of ink attached on the cut paper having the image already printed on the front surface. Such an arrangement will now be described as the second embodiment of the present invention.

Figure 7:
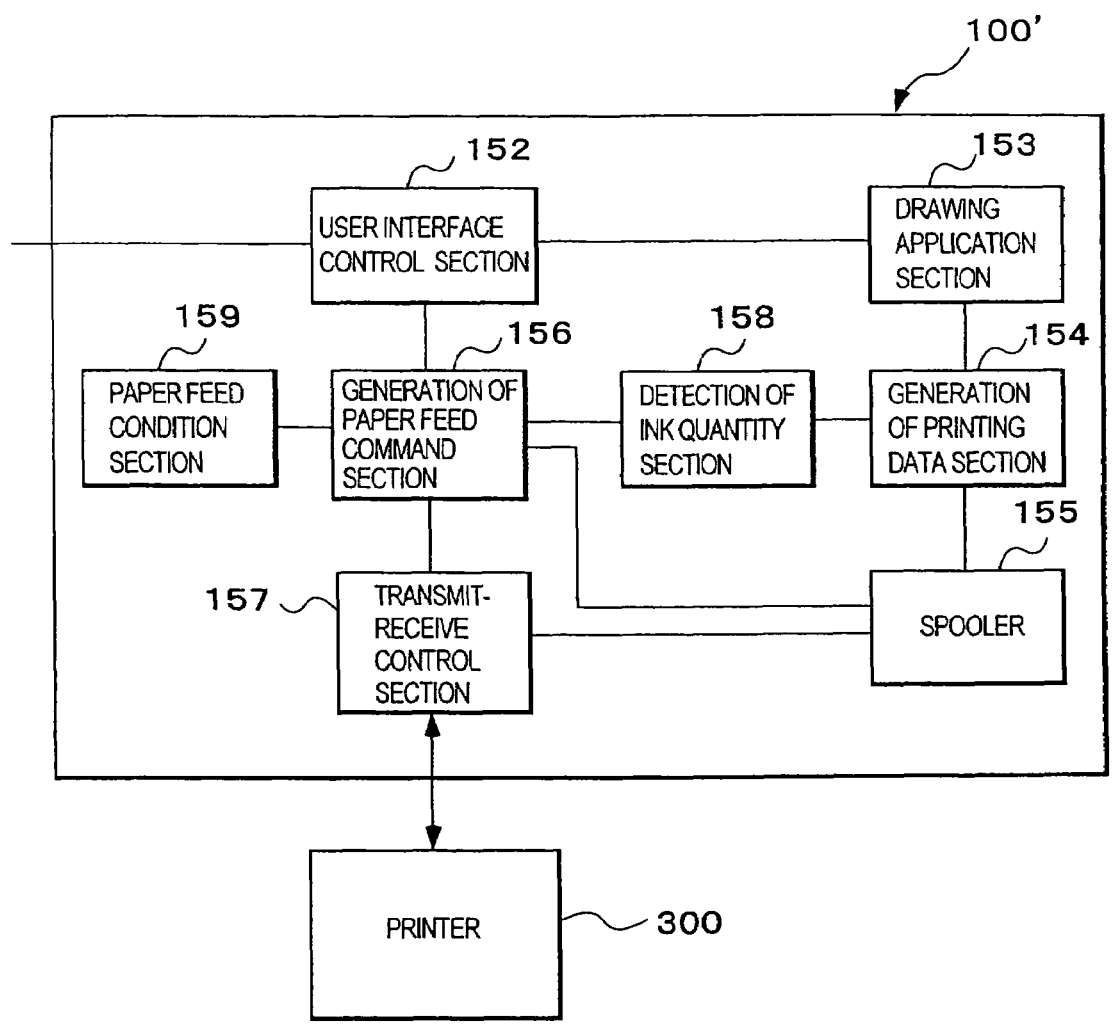
FIG. 7 is a functional block diagram of the host according to an embodiment of the present invention.

In this arrangement, as shown in FIG. 7, the host 100' further comprises an ink quantity detecting section 158 and a paper feed condition storing section 159 in addition to the functional structures described above (See FIG. 2). These novel functional structures are implemented by the hardware structure (See FIG. 1) as in the case of the host 100 described above and a program and data stored in the memory.

The paper feed condition storing section 159 includes a waiting time control table and a roller revolution control table.

As shown in FIG. 8, in the waiting time control table, as shown in FIG. 8, the range of the ink duty 800 of the cut paper A (ratio of the inked area with respect to the area of the cut paper A) and a setting value 801 of the waiting time Δt before printing on the back surface of the cut paper becomes.

On the other hand, in the roller revolution control table, as shown in FIG. 9, the range of the ink duty (%) 900 of the cut paper A, the number of driving pulses 901 of the upper and lower registering rollers 410 at the time of cut paper abutment, the number of pulses of the feeding roller 407 at the time of cut paper abutment, and the number of driving pulses of the feeding roller 407 at the time of cut paper retraction are registered. According to the roller revolution control table, the more the quantity of ink attached on the front surface of the cut paper A is, the higher the rotational speeds of the upper and lower registering rollers 410 and the feeding roller 407 at the time of the cut paper abutment becomes, further increasing the speed of rotation of the feeding roller 407 at the time of cut paper retraction.

The ink quantity detecting section 158 calculates the ratio of the inked area with respect to the area of the cut paper A after printing on the front surface is finished. More specifically, the number of dots for each color is calculated from print data generated by the print data creating section 154, and then from the result of calculation, the dotted area, and the size of the cut paper, the ink duty (%) of the cut paper A having a page image printed on the front surface is calculated.

The printer control process in the host 100' including these additional two functional structures differs from the printer control process described above in the following aspects. Since other aspects are the same as the printer control process described above, the description will be made according to FIG. 5 that has been used for explaining the printer control unit described above.

When the user interface control section 152 determines that the user has designated double-side printing mode (step 50) and the print data creating section 154 creates print data, the ink quantity detecting section 158 calculates the ink duty (%) of the cut paper A having the page image printed on the front surface, from the print data for the odd-numbered pages, out of thus created print data. The ink quantity detecting section 158 stores the calculated results being associated with the page number.

The, in the second process (step 60 to step 63), when the paper feed command creating section 156 determines that the setting value of the page counter Page is smaller than the total number of pages, it takes out the ink duty from the stored data in the ink quantity detecting portion 158 in ascending order of the page number. Then based on the obtained ink duty, the setting value of the waiting time Δt and the number of pulses supplied to the drive stepping motor of each roller 410, 407 are determined. More specifically, a waiting time Δt associated with the range 800 to which the obtained ink duty applies is retrieved from the waiting time control table (See FIG. 8) in the paper feed condition storing section 159. Likewise, three pulse numbers 901, 902, 903, corresponding to the range 900 to which the obtained ink duty applies is retrieved from the roller control table (See FIG. 9) in the paper feed condition storing section 159. Then the back surface paper feed command including these results of retrieval is generated (step 61).

The paper back surface feed command differs from the back surface paper feed command described above in that the sheet conveying unit of the printer 300 that accepted this command operates as follows. Here, only the differences from the above described case will be described.

When the waiting time Δt included in the back surface paper feed command has elapsed after the stop of rotation of the upper and lower registering rollers 410a, 410b, the take up roller 406 and the feeding roller 407 starts rotating in the directions B, $C_1$, to feed the cut paper A at a prescribed speed. Therefore, the cut paper A is taken up from the paper feed cassette 403 with delay of waiting time Δt according to the quantity of ink attached on the front surface. In other words, the more the quantity of ink attached on the front surface of the cut paper A is, the later the timing of taking up from the paper feed cassette 403 becomes.

Therefore, a minimum waiting time required for drying ink attached on the front surface is secured for each cut paper. Consequently, degradation of the quality of the page image printed on the front surface of the cut paper, which may be caused during the feeding for printing on the back surface thereof, is prevented and, simultaneously, decrease in throughput is also prevented.

At the time of cut paper abutment, the pulses corresponding to the number of pulses included in the back surface paper feed command (the number of drive pulses 901 of the upper and lower registering rollers at the time of cut paper abutment) are supplied to the drive stepping motor of the upper and lower registering rollers 410a, 410b within a unit time. At the same time, the pulses corresponding to the number of pulses included in the back surface paper feed command (the number of drive pulses 902 of the feeding roller at the time of cut paper abutment) are supplied to the drive stepping motor of the feeding roller 407 within a unit time. Therefore, the more the quantity of ink attached on the cut paper A is, the higher the speed of the upper and lower registering rollers 410a, 410b rotating in the direction $D_2$ to push back the cut paper A becomes, and the higher the speed of the feeding roller 407 rotating in the direction $C_1$ to push back the cut paper A becomes. In general, it is harder for the cut paper A to move more as the quantity of ink attached increases. However, by rotating these rollers 410a, 410b, 407 as described above, the cut paper A is smoothly pushed toward the nip between the upper and lower registering rollers 410a, 410b from behind irrespective of the quantity of ink attached and pushed back at the nip between the upper and lower registering rollers 410a, 410b. Therefore, in both cases of the cut paper A with a small quantity of ink attached thereon and of the cut paper A with a large quantity of ink attached thereon, sufficient slack is formed so that the whole part of the leading edge thereof reliably reach the nip between the upper and lower registering rollers 410a, 410b. Therefore, the skew of the cut paper A being conveyed for printing the back surface can be reliably corrected.

At the time of seat retraction, the pulses corresponding to the number of pulses included in the back surface paper feed command (the number of drive pulses 902 of the feeding roller at the time of sheet retraction) are supplied to the drive stepping motor of the feeding rollers 407 within a unit time. Therefore, the more the quantity of ink attached on the cut paper A is, the higher the rotation speed of the feeding roller 407 in the direction $C_2$ to push back the cut paper A becomes. As described above, it is harder for the cut paper A for move more as the quantity of ink attached increases. However, by rotating the feeding roller 407 as described above, the following edge of the cut paper A is smoothly pushed back to the paper feed tray 403 irrespective of the quantity of ink attached. Therefore, other cut papers pulled out together with the cut paper A can be reliably pushed back to the paper feed tray 403.

Though the quantity of ink attached on the front surface of the cut paper A is calculated according to print data in this embodiment, when the ink remaining detecting sensor is mounted on the printer, it is also possible to arrange in such a manner that the host makes an inquiry of the printer about the remaining quantity of ink before and after printing of the odd-numbered page image for one page, and the differential between those inquiries is calculated as the quantity of ink attached on the front surface of the cut paper A.

Though the length of the waiting time Δt is changed according to the ink duty of the cut paper A, it is also possible to arrange in such a manner that the length of the waiting time Δt is changed according to the type of the cut paper or the type of ink used, for example, utilizing the waiting time table in which the more the cut paper resists absorbing ink, the longer the waiting time becomes (See FIG. 10), and the waiting time table in which the more ink resists drying, the longer the waiting time becomes (See FIG. 11).

Though a stepping motor is used as a motor for rotating each roller in this embodiment, it is also possible to employ a DC motor as a motor for rotating each roller and in that case, it may be possible to control according to the number of pulses from an encoder.

Though a system structure including a printer in which double-side printing can be made by reversing the cut papers manually by the user is shown in the first and second embodiments, the present invention is not limited thereto. For example, the printing system including a printer that has a cut paper reversing mechanism is also applicable, which will be described below.

Figure 12:
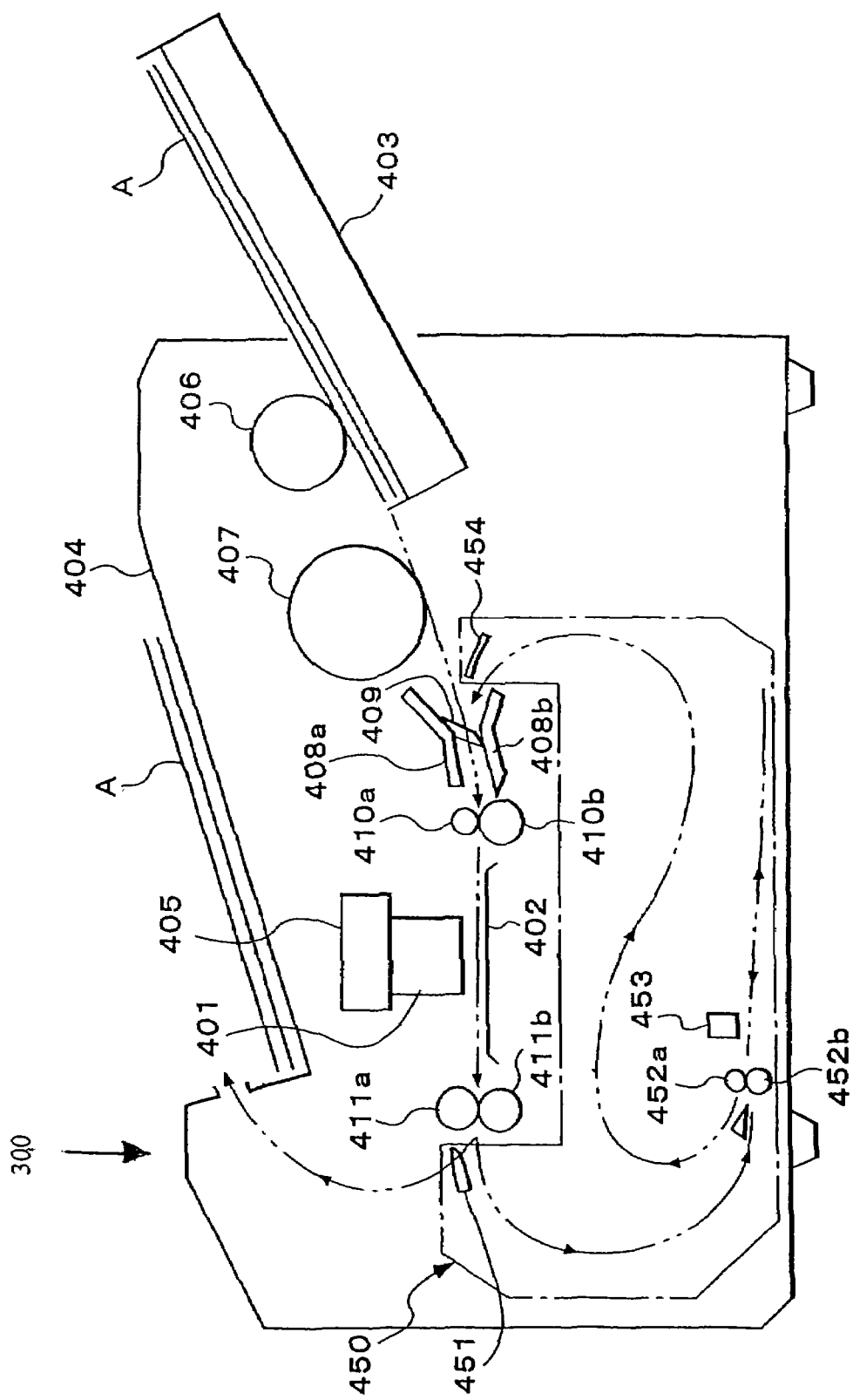
FIG. 12 is a schematic block diagram showing the internal construction of the ink jet printer according to an embodiment of the present invention.

The general structure of the printing system is almost the same as the printing system described above (See FIG. 1). However, the hardware structure of the printer included in this printing system is different from the printer described above (See FIG. 4). More specifically, as shown in FIG. 12, in addition to the structure of the printer described above, the printer 300' included in this system comprises a sheet reversing mechanism 450. The sheet reversing mechanism 450 comprises a switching guide 451 for switching the direction of movement of the cut paper A fed from the upper and lower discharging rollers 411a, 411b, the upper and lower rollers 452a, 452b for reversing the direction of movement of the cut paper A guided by the switching guide 451, a sheet detecting sensor 453 for detecting the cut paper A having passed between the upper and lower rollers 452a, 452b, and a guide plate 454 for guiding the cut paper A between the upper and lower guide plates 408a, 408b. When the sheet detecting sensor 453 detects the cut paper A, the printer control section 551 switches the direction of movement of the cut paper A from the side of the sheet reversing mechanism 450 toward the paper receiving tray 404, by controlling the tilting angle of the switching guide 451.

Figure 13:
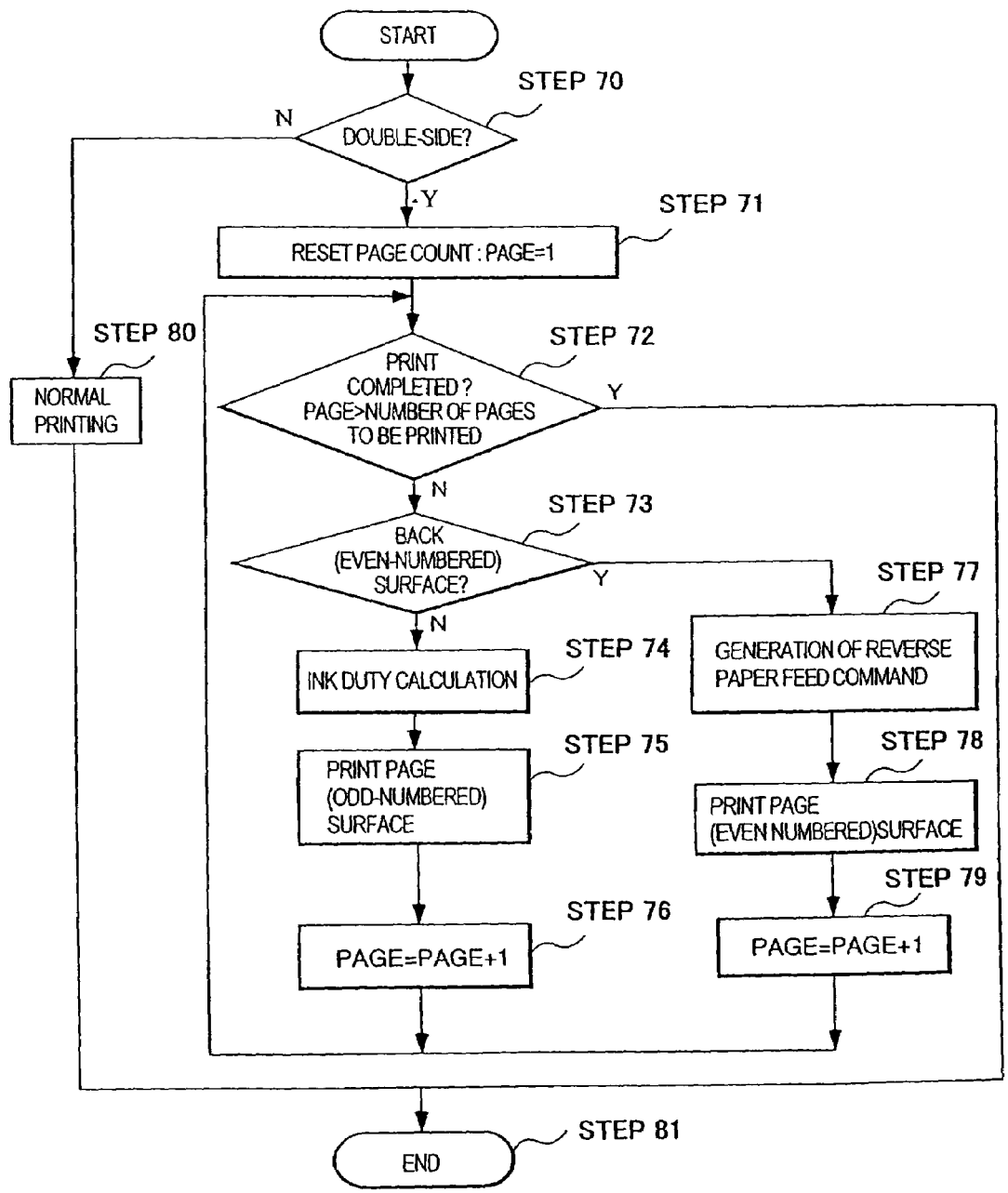
FIG. 13 is a flow chart showing the flow of the printer control process executed by the host according to an embodiment of the present invention.

The host for controlling the printer implements a functional structure similar to that implemented by the host 100 of the first embodiment described above (See FIG. 2). However, the printer control process executed by these functional structures is, as shown in FIG. 13, different from the printer control process executed by the functional structure of the host 100 according to the first embodiment described above.

When the user inputs a designation of the printing mode via the input section on the side of the host, and also a print execution command is inputted via the input section, the user interface control section accepts the designation of the printing mode made by the user and determines whether or not it is double-side printing mode (step 70).

When the user interface control section determines that the printing mode designated by the user is a printing mode other than double-side printing mode, as in the case described above, the print data creating section, etc., executes the normal one-side printing process. In other words, the print data from the drawing application executing section 153 is sequentially converted into print data for the printer, and the print data is transmitted to the printer 300 together with the normal paper feed command in ascending order of the page number (step 80). Thus the printer 300 prints each page image on one surface of the cut paper A in ascending order of the page number. The printer control process on the side of the host 100 terminates as well (step 81).

On the other hand, when the user interface control section 152 determines that the printing mode designated by the user is double-side printing mode, the paper feed command generating section 156 sets the initial value (Page=1) to the page counter Page (step 71). Then the following printing data transmitting process starts.

The paper feed command generating section 156 determines whether or not the setting value of the page counter Page exceeds the total number of pages to be printed (step 72).

When it is determined that the setting value of the page counter Page exceeds the total number of pages to be printed, the paper feed command generating section 156 determines that the all the print data transmission is completed. Accordingly, the printer control process is terminated on the side of the host 100 (step 81).

On the other hand, when it is determined that the setting value of the page counter Page is smaller than the total number of pages to be printed, the paper feed command generating section 156 determines whether or not the following print is printing on the even-numbered pages (step 73) according to the setting value of the page counter Page. The process thereafter can be divided according to the result of the determination above. More specifically, when the page counter Page is set to the odd number, the next printing operation is determined to be printing on the odd-numbered pages, and the third process described below (step 74 to step 76) is executed, and in other cases, the next printing operation is determined to be printing on the even-numbered pages, and the fourth process described below (step 77 to step 80) is executed.

(3) The Third Process (Step 74 to Step 76)

When the paper feed command generating section 156 determines that the next printing operation is for the odd-numbered pages, the print data creating section 154 converts into print data for the odd numbered pages for the printer the odd numbered page print data of which the page number is smallest out of the unconverted print data supplied from the drawing application executing section. When the print data for one odd-numbered page for the printer is created, the ink quantity detecting portion 158 calculates the ink duty (%) of the cut paper A based on the print data for this printer according to a similar process as the previous case and stores the calculated results, and the feed paper command generating section 156 generates a normal paper feed command. The normal paper feed command thus generated and the print data for one odd-numbered page are temporarily stored in the spooler as a spool file and transmitted to the printer 300 by the transmit-receive control section 157. The printer 300 that has received the normal paper feed command and the print data executes the process for printing the odd-numbered page image on the front surface of each cut paper A (step 75).

When the host receives "print completion" message from the printer 300, the transmit-receive control section 157 deletes the transmitted print data for the odd-numbered pages from the spooler 155, and the paper feed command generating section 156 increments the setting value of the page counter Page by one (step 76). Then, the process returns to step 72.

(4) The Fourth Process (Step 76 to Step 79)

When the paper feed command generating section 156 determines that the next printing operation is for the even-numbered pages, the print data creating section 154 converts into print data for the even-numbered pages for the printer the even-numbered page print data of which the page number is smallest out of the unconverted print data supplied from the drawing application executing section.

Then the paper feed command generating section 156 determines the setting value of the waiting time Δt and the number of pulses to be supplied to the drive stepping motor of each roller 410, 407 based on the data (ink duty of the cut paper A on which the previous odd-numbered page is printed) stored in the ink quantity detecting section 158 according to a similar process as in the previous case. Then the back surface paper feed command including the determined results (the setting value of the waiting time Δt, the number of pulses to be supplied to the drive stepping motor of each roller 410, 407) is generated (step 77).

The back surface paper feed command and the print data for the even-numbered page thus generated are temporarily stored in the spooler 155 as a spool file, and transmitted to the printer 300 by the transmit-receive control section 157. The printer 300 that has received the back surface paper feed command and the print data executes the process for printing the even-numbered page image on the back surface of each cut paper A (step 78).

When the host receives "print terminated" massage from the printer 300, the transmit-receive control section 157 deletes the transmitted print data for the even-numbered pages from the spooler 155, and the paper feed command generating section 156 increments the setting value of the page counter Page by one (step 79). Then, the process returns to step 72.

With this printer control process, as in the previous case, the cut paper A having page image printed on the front surface thereof is correctly registered with respect to the print head, and thus page image can be printed on the correct position on the back surface of the cut paper A with the image printed on the front surface thereof. As in the case described above, a waiting time is provided before starting printing on the back surface, degradation of the quality of the page image on the front surface during conveyance of the cut paper for printing on the back surface is prevented.

In the embodiments described so far, the period of time elapsed from the moment when printing on the front surface of the cut paper is finished is not considered as a waiting time. However, when the number of pages to be printed is large, ink on the front surfaces of the cut papers on which printing has been finished earlier starts to dry while printing for the front surfaces for the rest of the cut papers is still being executed. Therefore, by considering as a waiting time, the period of time elapsed from the moment when printing on the front surface of the cut paper is finished, the throughput will be improved. How to realize this idea will now be described taking the process shown in FIG. 13 as an example.

In order to include in the waiting time the period of time elapsed from the moment when printing on the front surface of the cut paper is finished, in the step 76 of the third process described above, the time when the paper feed command generating section 156 receives "print completion" message from the printer 300 (referred to as the time of completion of front surface printing $T_1$) is obtained from the internal counter and retained.

Then, in the step 77 of the fourth process described above, the paper feed command generating section 156 determines the waiting time Δt based on the data (ink duty of the cut paper A on which the previous odd-numbered page is printed) stored in the ink quantity detecting section 158, and obtains the present time $T_2$ from the internal counter, and then calculates the differential $T_2 - T_1$, between the present time $T_2$ and the time of completion of the front surface printing $T_1$ that is retained in the third process described above. Then, in the case where the value $\Delta t - (T_2 - T_1)$ obtained by subtracting the differential $T_2 - T_1$ from the waiting time Δt is not larger than zero, the actual waiting time is set to zero, and in the case where the value $\Delta t - (T_2 - T_1)$ is larger than zero, the actual waiting time is set to the value $\Delta t - (T_2 - T_1)$.

Consequently, the waiting time may be prevented from being elongated unnecessarily, thereby improving the throughput. This may be applicable to the process shown in FIG. 5.

The third embodiment of the present invention will now be described.

Figure 14:
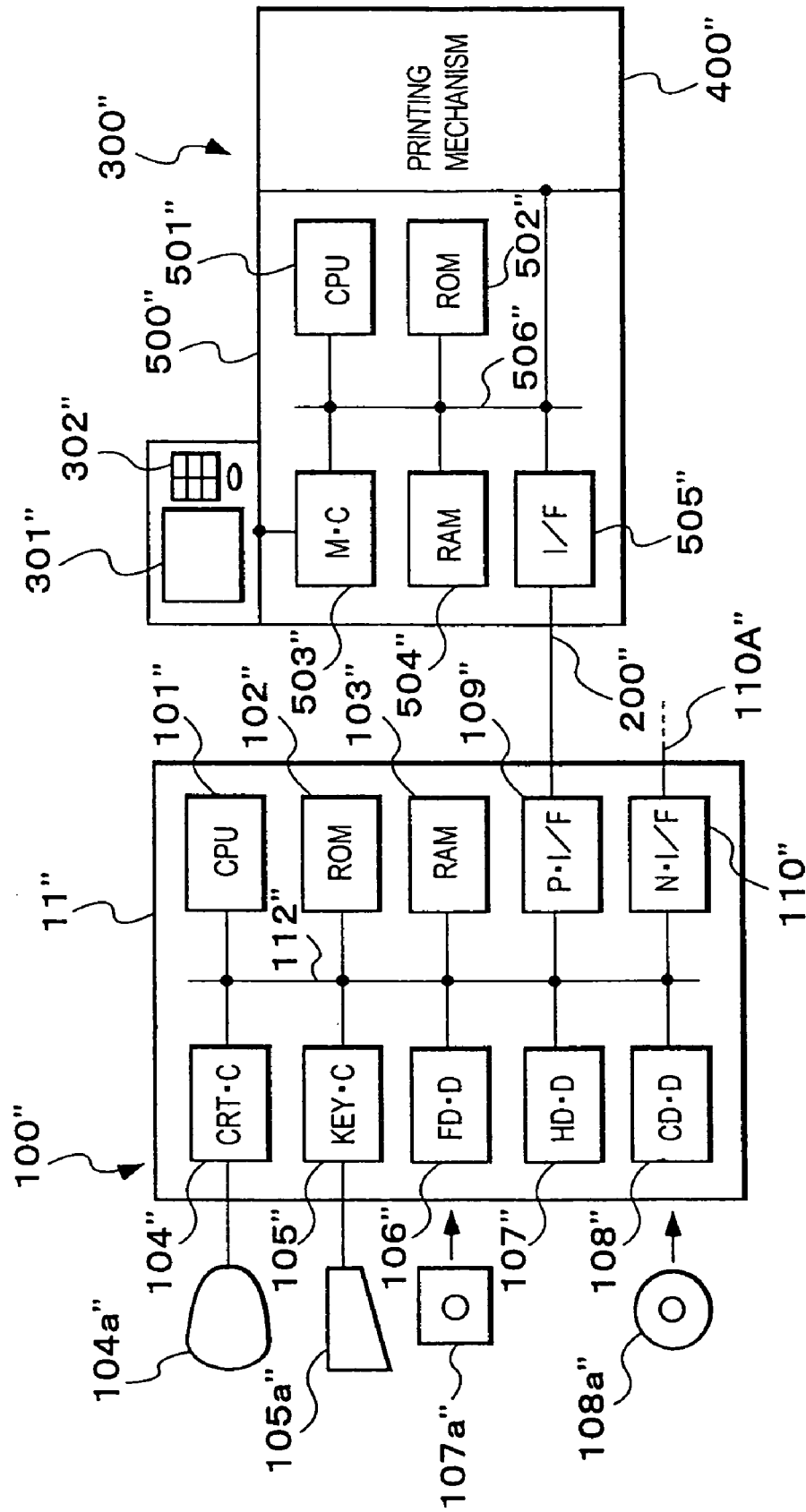
FIG. 14 is a schematic block diagram of the printer system according to an embodiment of the present invention.

The printer system according to this embodiment comprises a printer host 100", a printer 300" for printing based on the printing command supplied from the printer host 100", and a cable 200" connecting between the host 100" and the printer 300", as shown in FIG. 14.

In this embodiment, the host 100" has a hardware structure as a normal information processor as in the case of the host 100 in the first embodiment, described above. In other words, the enclosure 11 of the host 100" includes a CPU 101" for executing various programs, a ROM 102" having various control programs in advance, a RAM 103, a display controller 104" for controlling the display unit, a keyboard controller 105" for controlling the keyboard, a floppy disk drive 106", hard disk 107", CD-ROM drive 108", a printer interface 109"

to which a cable 200" is connected, a network interface 110" to be connected to the communication line 110a" as needed, and a bus 112" for transmitting data therebetween. In addition, as external input-output devices, a keyboard 105a" is connected to the keyboard controller 105" and a display unit 104a" is connected to the display controller 104". In the integrated hard disc 107" in the host 100", various application programs are installed in advance from the storage media such as the floppy disk 107a" or the CD-ROM 108a". For example, a drawing program for producing a page image to be printed by the printer 300", or a printer control program defining a printer control process described later are also included.

The printer 300" comprises a monitor 301", a printing mechanism 400", and a printer control unit 500" for controlling these elements. The printer control unit 500" comprises a CPU 501", a ROM 502" having various data and various programs stored therein, a RAM 504" in which various data or various programs are temporarily stored, a monitor controller 503" for controlling the monitor 301", and an interface 505".

Figure 15:
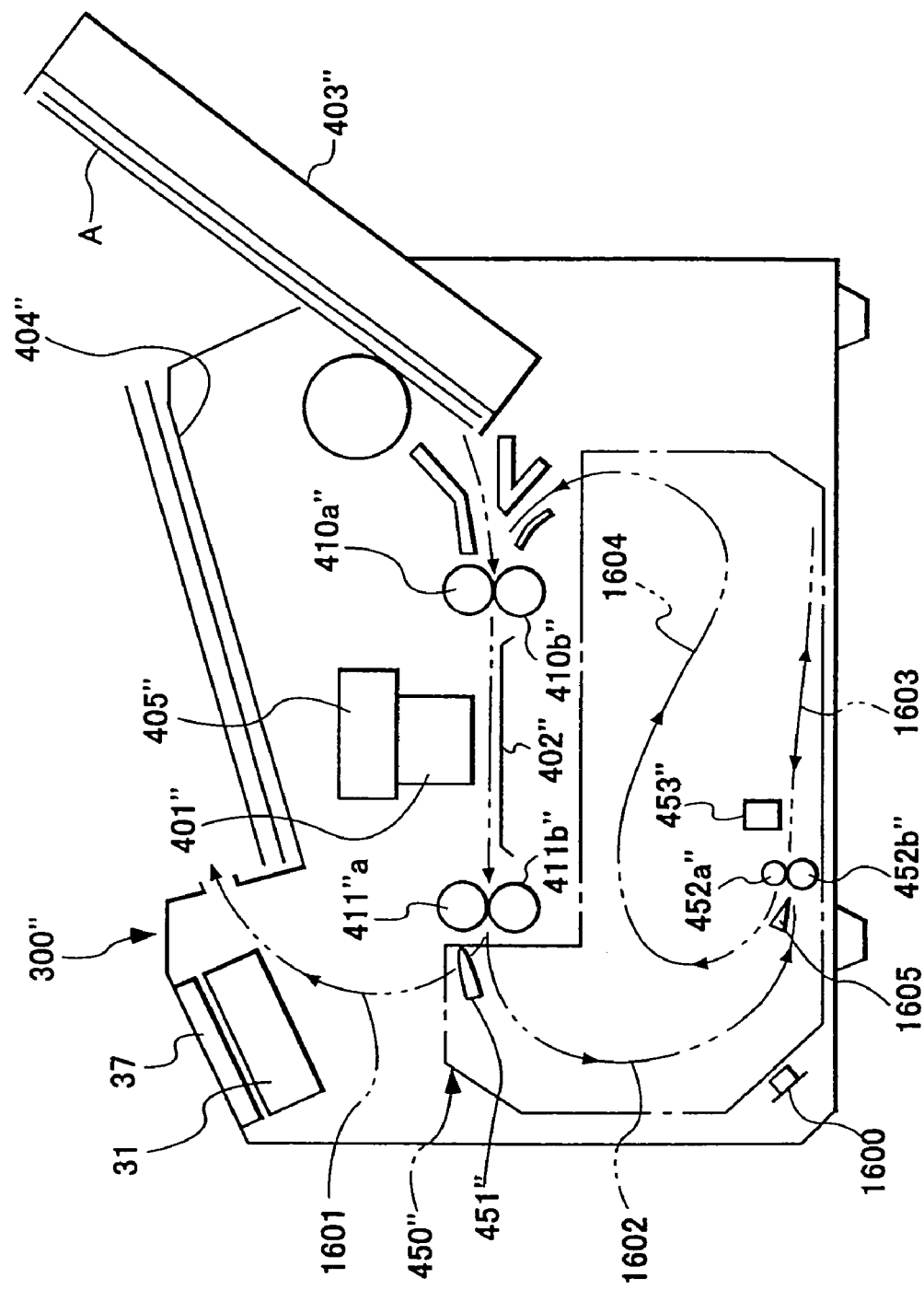
FIG. 15 is a block diagram showing the internal construction of the printing mechanism of the ink jet printer according to an embodiment of the present invention.

The printing mechanism 400" comprises, as shown in FIG. 15, a printing head 401" injecting various colors of ink, a head carrying mechanism 405" for carrying the printing head 401", a paper feed tray 403" for storing a number of cut papers A, registering rollers 410a", 410b" for guiding the cut paper A in the paper feed tray 403" between the printing head 401" and the platen 402", a paper discharging rollers 411a", 411b" for discharging the printed cut paper A, a reversing mechanism 450" for reversing the cut paper A in double-side printing, and an installation sensor (installation detecting means) 1600 for detecting whether or not the reversing mechanism 450" is installed. In this embodiment, the reversing mechanism 450" may be installed later as an option, or may be installed in advance. The installation sensor 1600 is used for detecting whether or not the optional reversing mechanism 450" is installed. The reversing mechanism 450" comprises a first switching lever 451" for guiding the cut paper A from the discharging path 1601 of the paper discharging mechanisms 411a", 411b" into the reversing path 1602, reversing rollers 452a", 452b" for feeding the cut paper A into the reversing position 1603 and also discharging the cut paper A therefrom, a reversing position detecting sensor 453" for detecting that the cut paper A has reached the reversing position 1603, and the second switching lever 1605 for guiding the cut paper A to the reversing position 1603 and also to a returning path 1604. The reversing position detecting sensor 453" is used for reversing the rotating direction of the reversing rollers 452a", 452b" and changing the direction of the second switching lever 1605 upon detecting the fact that the cut paper A has reached the reversing position 1603.

Figure 16:
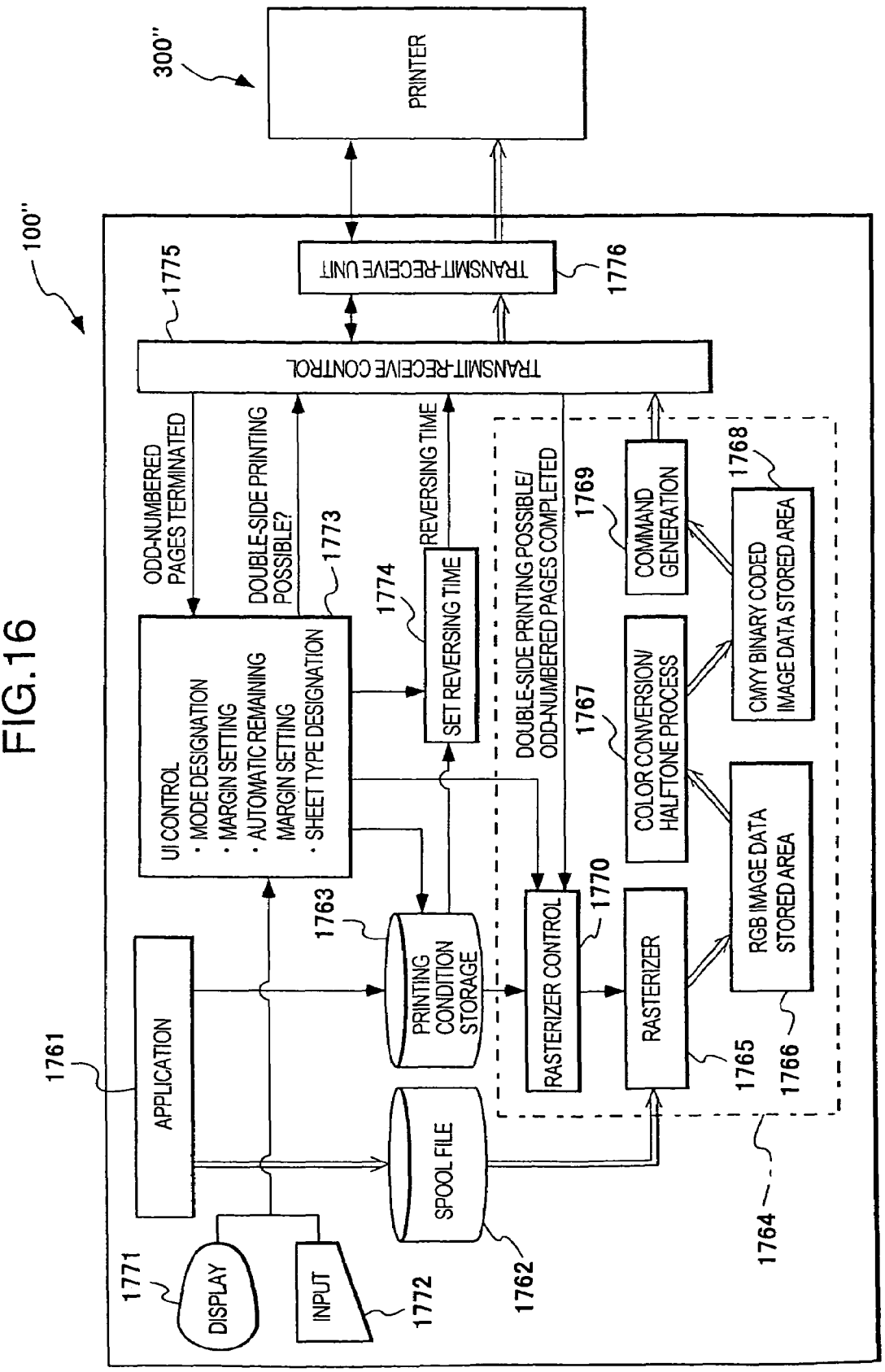
FIG. 16 is a functional block diagram of the host according to an embodiment of the present invention.

The printer host 100" functionally comprises, as shown in FIG. 16, an application (drawing command generating means) 1761, a spool file storing section 1762 for storing the drawing command generated by the application 1761 as a spool file, a printing condition storing section (storage means) 1763 for storing the printing conditions, a printing command generating section (printing command generating means) 1764 for generating a printing command from a bundle of drawing commands for one job, a display section (display means) 1771 for displaying various data, an input section (mode designation means, margin setting means, sheet type designation means) 1772 for entering the user's instruction, a user interface control section (mode designation means, display means, margin designation means, automatic margin setting means, sheet type designation means) 1773 for controlling the display section 1771 and the input section 1772, a reversing time setting section (reversing time setting means) 1774 for setting the reversing time for the sheet during double-side printing according to the type of the cut paper, a transmit-receive control section (transmit-receive means, transmit-receive control procedure) 1775 for controlling the transmission-reception of data with the printer 300", and a transmit-receive section (transmit-receive control means) 1776 for transmitting/receiving data with the printer 300".

The printing command generating section 1764 comprises a rasterizer 1765 for converting a drawing command into RGB image data, a rasterizer control section (drawing control means) 1770 for controlling the rasterizer 1765, a RGB image data expansion area 1766 where the RGB image data is expanded, a color conversion/halftone processing section 1767 for conducting a color conversion process and a half tone process for the RGB image data and generating CMYK binary coded image data, CMYK binary coded image data expansion area 1768 where CMYK binary coded image data is rasterized, and a command generating section 1769 for converting CMYK binary coded image data into a printing command that can be interpreted by the printer 300".

Figure 17:
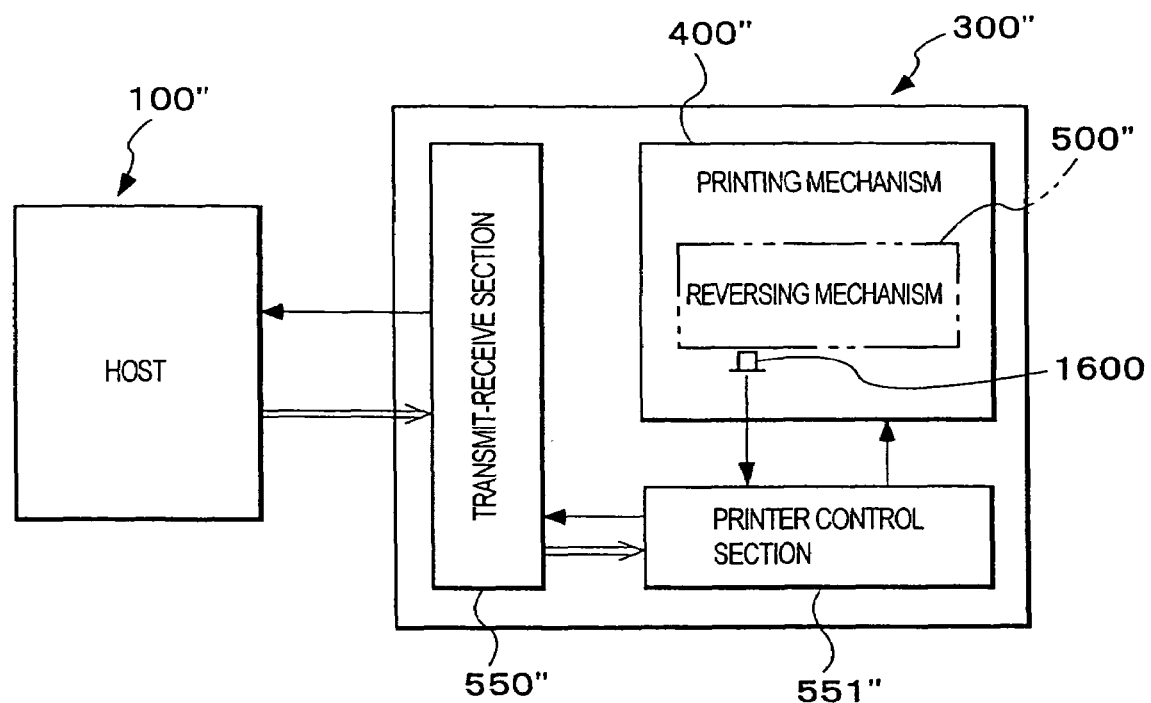
FIG. 17 is a functional block diagram of the ink jet printer according to an embodiment of the present invention.

The ink jet printer 300" functionally comprises, as shown in FIG. 17, a printer control section 551" for controlling the printing mechanism 400" according to the printing command from the host 100", and a transmit-receive section (transmit-receive means) 550" for transmitting-data with the host 100".

The application 1761, the printing command generating section 1764, a user interface control section 1773, a reversing time setting section 1774, and the transmit-receive control section 1775 out of various functional components of the printer host 100" perform functions when the CPU 101" executes a program loaded in the RAM 103". The spool file storing section 1762 and the printing condition storing section 1763 comprise a RAM 103" respectively. The display section 1771 comprises a display unit 104a, a display controller 104", a CPU 101", and a RAM 103", and an input section 1772 comprises a keyboard 105a", a keyboard controller 105", a CPU 101", and a RAM 103". The transmit-receive section 1776 comprises a CPU 101", a RAM 103", and a printer interface 109". The program for executing the function of the printer host 100" can be loaded into the RAM 103" from the CD-ROM 108a" (shown in FIG. 14) on the CD-ROM drive 108".

Among various functional components of the ink jet printer 300", the printer control section 551" comprises a ROM 502" in which various programs are stored, a RAM 504" and a CPU 501" for executing the program, and the transmit-receive section 550" comprises a CPU 501", a ROM 502", a RAM 504", and an interface 505".

Figure 18:
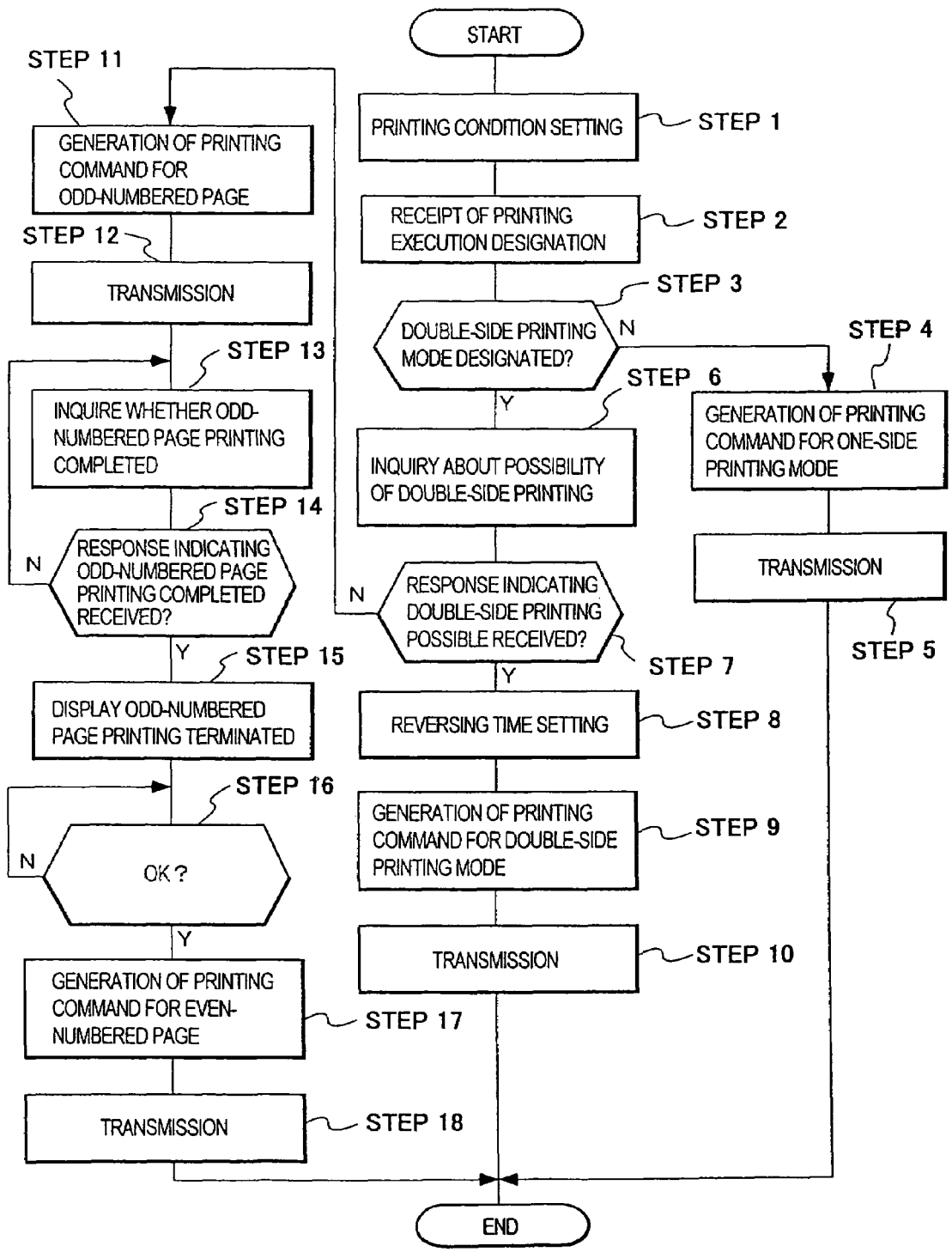
FIG. 18 is a flow chart showing the flow of the printer control procedure executed by the host according to an embodiment of the present invention.

Referring now to the flow chart shown in FIG. 18, the operation of the printer system according to this embodiment will be described.

Figure 19:
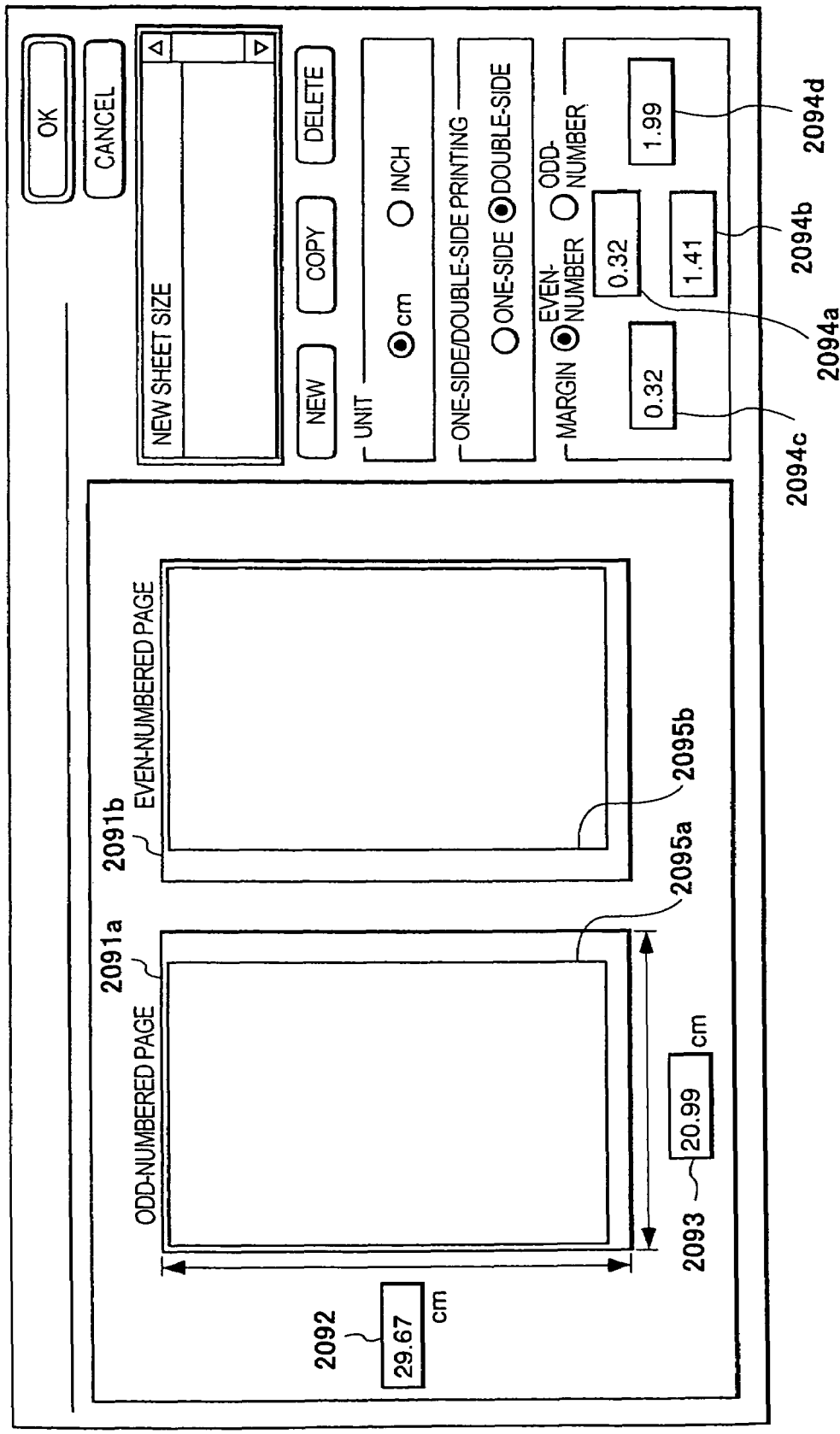
FIG. 19 is a drawing showing the graphical user interface for margin setting according to an embodiment of the present invention.

The host 100" accepts various printing conditions by the operation of the input section 1772 by a user (step 1). The printing condition includes a size of cut paper, type of cut paper, a margin on the printing cut paper, or a mode of one-side printing/double-side printing. When a designation of double-side printing mode is accepted, a confirmation message saying, "Is the ink cartridge for double-side printing set?" is displayed on the screen of the display section. Further, as shown in FIG. 19, a cut paper for the odd-numbered page 2091a and a cut paper for the even-numbered page 2091b are displayed on the screen of the display section 1771. On the cut paper 2091a displayed, the vertical size 2092 and the horizontal size 2093 are displayed as well. The respective sizes of the upper margin, the bottom margin, the left margin, and the right margin 2094a, 2094b, 2094c, and 2094d are displayed in the upper, bottom, left and right spaces.

The user designates the margin are on the cut paper while viewing this screen, and also designates whether it is the margin designation for the odd-numbered pages, or the margin designating for the even-numbered pages. This is because the position of the binding margin of the odd-numbered page differs from that of the even-numbered page, and thus the left and right margins of the odd-numbered page are different from those of the even-numbered page. Subsequently, the user inputs the sizes in the size input areas 2094a, 2094b, 2094c, 2094d for the upper margin, the bottom margin, the left margin, and the right margin, respectively. For example, when the user inputs the sizes for the respective margins after designating the specification of the margin area of the even-numbered page, a borderline 2095b of the margin is displayed within the cut paper of the even-numbered page 2091b displayed on the screen. Moreover, in conjunction with the setting of the margin of the even-numbered page 2091b, the margin of the odd-numbered page is also set automatically by the user interface control section 1773, and the borderline 2095a of the margin is displayed on the cut paper of the odd-numbered page 2091a displayed on the screen. When the margin setting is performed for the odd-numbered pages, the upper margin, the bottom margin, the right margin, and the left margin for the even-numbered page are respectively set to the values of the upper margin, the bottom margin, the left margin, and the right margin of the odd-numbered page automatically. In other words, the size of the left margin of the even-numbered page is set to the value of the left margin of the odd-numbered page, and the size of the right margin of the even-numbered page is set to the value of the left margin of the odd-numbered page automatically. If the user wants to change the margin of the odd-numbered page that is set automatically, the user further designates the specification of the margin of the odd-numbered page, and inputs each margin. This input results have a priority over the margin sizes set automatically.

Subsequently, the host 100" accepts the execution of printing operation by operating the input section 1772 by the user (step 2). The host 100" determines whether or not it is a designation of double-side printing mode, and if not, generates a command for one-side printing mode, in other words, a normal printing command (step 4) and transmits it to the ink jet printer 300" (step 5). When double-side printing mode is designated, an inquiry is made asking "double-side printing is available?" from the transmit-receive section 1776 to the printer 300" (step 6).

The printer 300" responses saying, "double-side printing is available" from the transmit-receive section 550" to the host 100" when the installation sensor 1600 detects that the reversing mechanism 450" is installed.

Upon receipt of the response saying "double-side printing is available" from the printer 300" (step 7), the reversing time setting section 1774 sets the sheet reversing time in the double-side printing operation for the printer 300". This reversing time is transmitted from the transmit-receive section 1776 to the printer 300". When the ink jet printer 300" carries out double-side printing, if the side of the cut paper is reversed after printing on the front surface without drying ink on the surface, the ink on the surface is rubbed by the roller or the like, thereby degrading the quality of the print on the surface. Therefore, in this embodiment, the reversing time setting section 1774 sets the reversing time according to the type of cut paper preset at the time of the printing condition setting (step 1). The printing condition storing section 1763 has the relation between the type of cut paper and the reversing time stored in advance, and the reversing time setting section 1774 determines the reversing time referring to the relation described above. Though the reversing time is determined according only to the type of the cut paper in this embodiment, the reversing time may also be determined according to both the type of cut paper and the type of ink. It is also possible to designate the reversing time by manually entering the value by the user.

When the reversing time is designated (step 8), the printing command for the double-side print mode is generated and transmitted from the transmit-receive section 1776 to the printer 300" (step 9).

Figure 20:
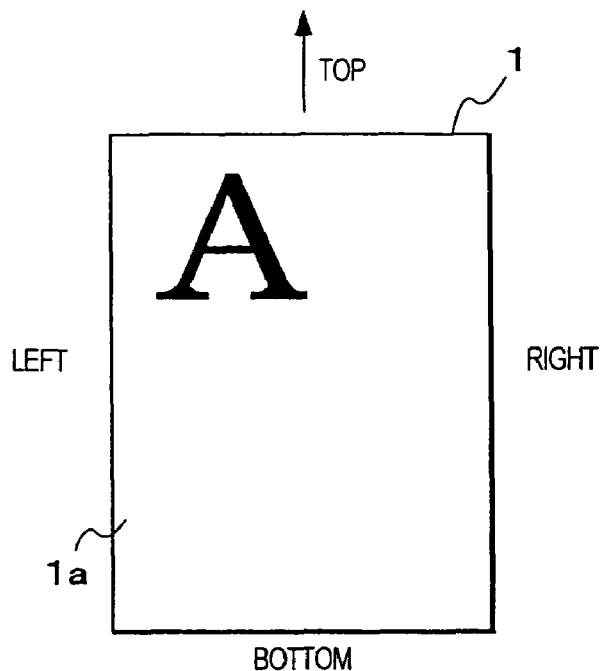
FIG. 20 is a drawing showing a state of the front surface of a cut sheet paper after printing has made on the front surface.
Figure 21:
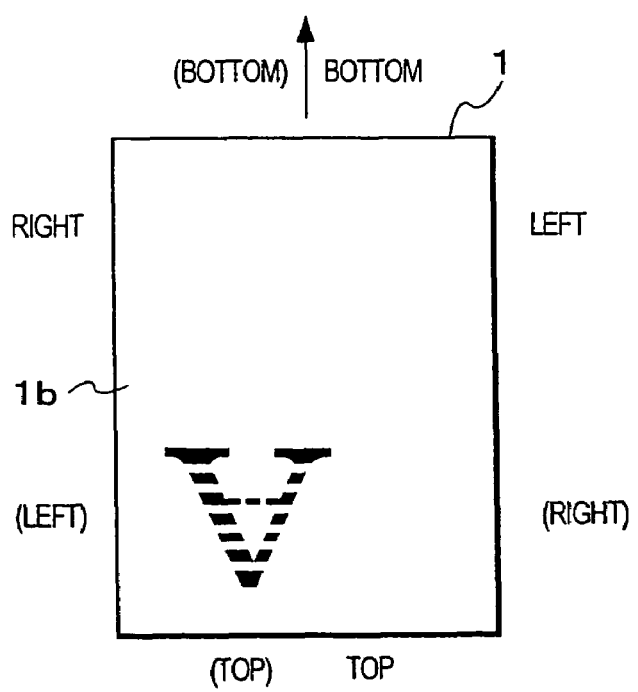
FIG. 21 is an explanatory drawing showing the back surface of a cut sheet paper shown in FIG. 20 in the state being printed.

In double-side printing by the printer 300", as shown in FIG. 20, when the cut paper A is reversed by the reversing mechanism 450" of the printer 300" after printing on the odd-numbered page $A_1$ is finished, the cut paper A is inverted upside down as shown in FIG. 21. Therefore, when printing the image on the reverse side, that is, on the even-numbered page $A_2$, the image has to be turned by 180°. In FIG. 20 and FIG. 21, the arrow indicates the cut paper feeding direction toward the printing head, and the parenthesized words; top, bottom, left and right indicate the top, bottom, left and right of the odd-numbered page $A_1$, and the words; top, bottom, left and right without parentheses indicate the top, bottom, left, and right of the even-numbered page $A_2$. In generating the printing command for double-side printing mode (step 9), a printing command in which the image of the even-numbered page $A_2$ is turned by 180° with respect to the image of the odd-numbered page $A_1$ is generated.

More specifically, the rasterizer 1765 of the printing command generating section 1764 converts the drawing command stored in the spool file storing section 1762 into the RGB image data, and expands the RGB image data on the expansion area 1766. Then RGB image data is subjected to a color conversion process and a halftone process at the color conversion/halftone processing section 1767, converted into CMYK binary coded image data, and then expanded on the expansion area 1768. Subsequently, it is converted into the printing command that can be interpreted by the printer 300" at the command generating section 1769, and the resultant printing command is transmitted from the transmit-receive section 1776 to the printer 300". When the printing command for one page is transmitted to the printer 300", the printing command generating section 1764 generates a command for the next page, that is, a command for the back surface thereof. In such a case, the rasterizer 1765 converts the drawing command into RGB image data by an instruction from the rasterizer control section 1770, inverts the image upside down and rasterizes it in the stored area 1766. When the color conversion/halftone processing section 1767 reads the RGB image data from the stored area 1766, it reads the RGB image data from the opposite side bilaterally, to convert into CMYK binary coded image data, and rasterizes in the stored area 1768. Consequently, the image data on the back surface is rasterized on the stored area 1768 in the state of being turned by 180°. Then CMYK binary coded image data converted into a command at the command generating section 1769 and transmitted to the printer 300" as a printing command for the back surface.

Upon receipt of the commands described above, the printer 300" starts printing on the front surface of the cut paper according to the printing command for the odd-numbered pages transmitted in advance. When printing on the front surface is finished, the cut paper is sent to the reversing mechanism 450", reversed there, and sent again to the position opposing to the printing head. Then, printing is performed according to the printing command for the even-numbered page which is supplied at a later time, so that printing on both surfaces is completed. In this case, the reversing time from the moment when printing on the front surface is finished until printing for the back surface starts is the reversing time supplied from the host 100" in the step 8. In this way, in this embodiment, since printing on the back surface is not started until ink on the front surface is dried, degradation of the quality of the print by being rubbed by the roller or the like can be prevented.

In the step 7, when the responses other than "double-side printing is available", for example "double-side printing is inavailable", or "error in inquiry" are supplied from the printer 300", the printing command generating section 1764 generates a printing command only for the odd-numbered pages sequentially (step 11), and the transmit-receive section 1776 transmits the generated command to the printer 300" (step 12).

In generating the printing command only for the odd-numbered page, the rasterizer control unit 1770 of the printing command generating section 1764 gives an instruction to the rasterizer 1765, and allows the rasterizer 1765 to read the drawing command only for the odd-numbered page from the spool file storing section 1762. The printer 300" executes printing in the normal one-side printing mode according to the printing command only for the odd-numbered pages.

When transmission of the printing command only for the odd-numbered pages is finished (step 12), the transmit-receive section 1776 makes inquiry of the printer 300" whether or not the printing job for the odd-numbered pages has been finished (step 13). Upon receipt of a response of "printing for the odd-numbered pages is completed" from the printer 300" (step 14), the display section 1771 of the host 100" displays a message, "Printing for the odd-numbered pages has been completed. Prepare for printing of the even-numbered pages", together with an "OK" button (step 15).

When the user viewed the display, he or she reverses the cut papers A having images printed only on the odd-numbered pages on the paper receiving tray 404" (shown in FIG. 15) of the printer 300", and sets the cut papers on the paper feed tray 403" again. When the setting is completed, the user clicks the "OK" button displayed on the display section 1771.

When the "OK" button is clicked, the host 100" generates the printing command only for the even-numbered pages (step 17) and transmits it sequentially to the printer 300" (step 18). When the printing command is received, the printer 300" prints images on the even-numbered pages on the back surfaces of the cut papers having the images on the odd-numbered pages.

In this embodiment, irrespective of whether the host 100" is connected to the ink jet printer with the double-side printing function, or to the ink jet printer without the double-side printing function, a designation of double-side printing mode enables a double-side printing, thereby reducing the burden of the user.

In the case where double-side printing is carried out by the ink jet printer having the double-side printing function, since the cut paper is not reversed until the ink on the surface being printed earlier is dried, degradation of the image on the side of the surface previously printed may be prevented.

In this embodiment, values of the left and right margins can be set differently for the odd-numbered pages and for the even-numbered pages. Here, this margin setting is also available for one-side printing mode.

Figure 22:
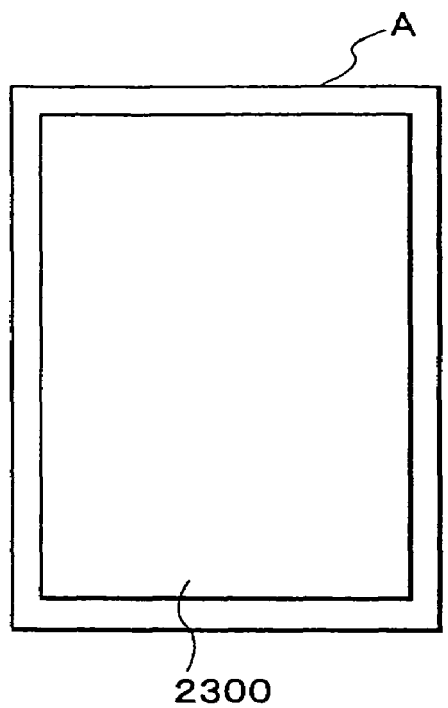
FIG. 22 is a drawing conceptually showing a printing area set for the sheet according to an embodiment of the present invention.
Figure 23:
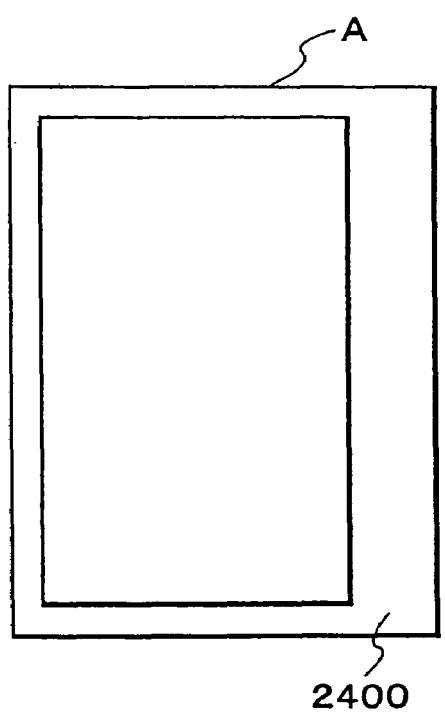
FIG. 23 is drawing conceptually showing a margin set for a cut sheet paper.
Figures 24A, 24B:
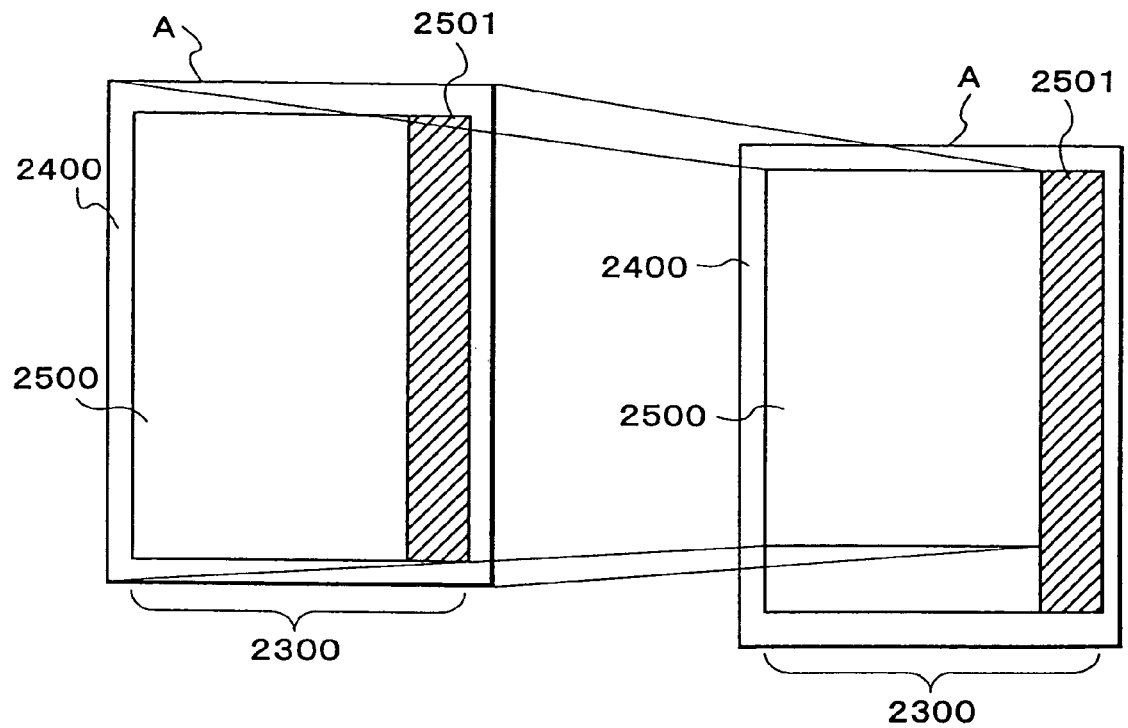
FIGS. 24A and 24B are drawings instructing a process performed when the margin of FIG. 23 overlaps a part of printing area shown in FIG. 22.

When the printing area 2300 is designated as shown in FIG. 22 to set the printing condition via the application 1761 (step 1), and the margin 2400 is set as shown in FIG. 23, the area which is available for printing is limited within the area designated by the margin setting, thereby decreasing the area in comparison with the intended area 2300. Therefore, in this embodiment, when the margin 2400 overlaps a part of the printing area 2300 designated via the application 1761, as shown in FIGS. 24A, 24B, the image of a whole page is downsized with the same aspect ratio and expanded so that the whole part of the image can be accommodated within the area 2500, excluding the overlapped portion 2501. When expanding the downsized image in this way, a message asking whether the image may be downsized or not, or a message notifying that the image being downsized will be displayed, since the printed image will not be the same size as the user intended. Though the image is downsized so that the image of the whole page can be accommodated in the area 2500 excluding the overlapped area 2501 within the printing area 2300, it is also possible to arrange in such a manner that the image within the printing area that is initially designated is accommodated within the area 2500. In this downsizing operation, the rasterizer control section 1770 determines the rates of reduction according to the printing area and the margins stored in the printing condition storing section 1763, and informs the rates of reduction to the rasterizer 1765 when the rasterizer 1765 expands the drawing command into the image, so that the image is expanded in the determined rate of reduction.

Though the binding margin on the left and right sides of the cut paper is taken into account in the embodiments described so far, it is also possible to consider both the margins on the left and right sides, and the margins on the top and bottom.

Figure 25:
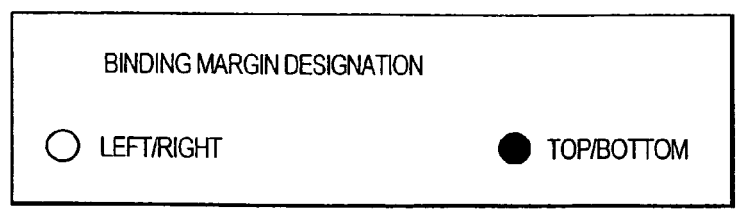
FIG. 25 is an explanatory drawing showing the position of the binding margin specified in the graphical user interface for margin setting according to an embodiment of the present invention.

In this case, the binding margin position designating screen as shown in FIG. 25 for selecting the position of binding margin either the left/right or the top/bottom in the margin setting screen shown in FIG. 19, so that the position of the binding margin can be selected. Under such a condition, when the position of the binding margin is designated to be left/right position, as in the case of the embodiment described above, and when the printer is available for performing double-side printing, the printer host transmits the printing command for the upright printing image for the odd-numbered pages, and the printing command for the inverted printing image (the image obtained by turning the upright printing image by 180°) for the even-numbered pages. In the case where the printer is not available for performing double-side printing, the printing command for the upright printing image is transmitted both for the odd-numbered page and the even-numbered page. In the case where the position of the binding margin is the top/bottom, and when the printer is available for performing double-side printing, the printer host transmits the printing command of the upright printing image both for the odd-numbered pages and the even-numbered pages, and when the printer is not able to perform double-side printing, the printer host transmits the printing command for the upright printing image for the odd-numbered pages, and the printing command for the inverted printing image for the even-numbered pages.

According to the third embodiment of the present invention, irrespective of whether the printer host is connected to the ink jet printer with the double-side printing function or to the ink jet printer without the double-side printing function, a designation of double-side printing mode enables a double-side printing, thereby reducing the burden of the user.

Though the embodiments of the present invention have been described as the first, second, and third embodiments separately, the structures included in each embodiment can be combined as needed.

What is claimed is:

1. A printer control unit for issuing a command to a printer which suspends the advancement of a printing medium, which is being fed by the rotation of a feeding roller, by a registering roller located forward of said printing medium, comprising:
   mode designation receiving means for receiving the designation of double-side printing mode in which both surfaces of the printing medium are target surfaces to be printed;
   command generating means for generating a command, upon receipt of the designation of said double-side printing mode by said mode designation receiving means, for rotating said registering roller in the direction to move said printing medium backward before restart of advancement and rotating said feeding roller in the direction to move said printing medium forward synchronizing with the rotation of said registering roller in order to feed said printing medium for printing a second image that is to be printed later out of a pair of images to be printed on both surfaces of said printing medium; and
   command issuing means for issuing said command generated by said command generating means as said command to be supplied to said printer.

2. The printer control unit as set forth in claim 1, further comprising:
   detecting means for detecting information on quantity of ink used for printing a first image on the printing medium, the first image is to be printed ahead of the other one of said pair of images,
   wherein said command generating means generates a command for rotating said registering roller and said feeding roller at a rotational speed in accordance with information detected by said detecting means on said first image to be printed in combination with said second image as a command for feeding said printing medium for printing said second image.

3. The printer control unit as set forth in claim 1, wherein said command generating means generates a command for rotating said registering roller and said feeding roller at a rotational speed in accordance with a type of said printing medium as a command for feeding said printing medium on which said second image is to be printed.

4. The printer control unit as set forth in claim 2, wherein said command generating means generates a command for rotating said registering roller and said feeding roller at a rotational speed in accordance with a type of said printing medium as a command for feeding said printing medium on which said second image is to be printed.

5. A computer readable medium having a program stored therein for controlling a printing mechanism that suspends the advancement of a printing medium, which is being fed by rotation of a feeding roller to a registering roller located forward of said printing medium, said program makes a printer control unit for controlling said printing mechanism execute:
   a printing mode designation receiving process for receiving designation of double-side printing mode in which both surfaces of the printing medium are target surfaces for printing;
   a command generating process for generating a feed command, upon receipt of the designation of said double-side printing mode, for rotating said registering roller in direction to move said printing medium backward before restart of advancement and for rotating said feeding roller in the direction to move said printing medium forward synchronizing with the rotation of said registering roller in order to feed said printing medium for printing a second image that is to be printed later out of a pair of images to be printed on both surfaces of said printing medium; and
   a command issuing process for issuing said feed command generated by said paper feed command generating process.

6. The computer readable medium as set forth in claim 5, wherein when the double-side printing mode is designated, said program makes said printer control unit execute a detecting process for detecting information on quantity of ink used for printing a first image which is to be printed ahead of the other image of said pair of images, and generate a command for rotating said registering roller and said feeding roller at a rotational speed in accordance with the detected information on the first image paring with said second image.

7. The computer readable medium as set forth in claim 5, wherein said program makes said printer control unit generate a command for rotating said registering roller and said feeding roller at a rotational speed in accordance with a type of said printing medium as a feed command for feeding said printing medium for printing said second image.

* * * * *